(12) United States Patent
Kani et al.

(10) Patent No.: US 12,538,796 B2
(45) Date of Patent: Jan. 27, 2026

(54) HIGH-FREQUENCY MODULE AND COMMUNICATION DEVICE

(71) Applicant: Murata Manufacturing Co., Ltd., Kyoto (JP)

(72) Inventors: Hiroyuki Kani, Kyoto (JP); Yoshihiro Yoshimura, Kyoto (JP); Takahiro Yamashita, Kyoto (JP); Ryo Wakabayashi, Kyoto (JP); Takashi Hirose, Kyoto (JP); Kiyoshi Aikawa, Kyoto (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 374 days.

(21) Appl. No.: 18/324,314

(22) Filed: May 26, 2023

(65) Prior Publication Data
US 2023/0298959 A1 Sep. 21, 2023

Related U.S. Application Data

(63) Continuation of application No. PCT/JP2021/046364, filed on Dec. 15, 2021.

(30) Foreign Application Priority Data

Dec. 23, 2020 (JP) ................................. 2020-214085

(51) Int. Cl.
*H01L 23/00* (2006.01)
*H01L 23/367* (2006.01)
(Continued)

(52) U.S. Cl.
CPC ...... *H01L 23/367* (2013.01); *H01L 23/49816* (2013.01); *H01L 23/49827* (2013.01);
(Continued)

(58) Field of Classification Search
CPC ....... H01L 23/28; H01L 23/34; H01L 23/367; H01L 23/3672; H01L 23/3675;
(Continued)

(56) References Cited

U.S. PATENT DOCUMENTS

| | | |
|---|---|---|
| 2002/0000895 A1 | 1/2002 | Takahashi et al. |
| 2002/0002038 A1 | 1/2002 | Seawright et al. |

(Continued)

FOREIGN PATENT DOCUMENTS

| | | |
|---|---|---|
| JP | 2002-016450 A | 1/2002 |
| JP | 2007-214350 A | 8/2007 |

(Continued)

OTHER PUBLICATIONS

International Search Report for PCT/JP2021/046364 dated Mar. 1, 2022.

*Primary Examiner* — Reema Patel
(74) *Attorney, Agent, or Firm* — McDonald Hopkins LLC

(57) ABSTRACT

A possible benefit of the present disclosure is to further improve a heat dissipation property of an electronic component. A high-frequency module includes a mounting substrate, a filter (for example, a transmission filter), a resin layer, a shielding layer, and a metal member. The resin layer covers at least a portion of an outer peripheral surface (for example, an outer peripheral surface) of the filter. The shielding layer covers at least a portion of the resin layer. The metal member is disposed at a first principal surface of the mounting substrate. The metal member is connected to a surface of the filter on the opposite side from the mounting substrate, the shielding layer, and the first principal surface of the mounting substrate.

19 Claims, 14 Drawing Sheets

(51) Int. Cl.
  *H01L 23/498* (2006.01)
  *H01L 23/552* (2006.01)
  *H01L 23/66* (2006.01)
  *H04B 1/036* (2006.01)
  *H04B 1/04* (2006.01)

(52) U.S. Cl.
  CPC ............ *H01L 23/552* (2013.01); *H01L 23/66* (2013.01); *H01L 24/09* (2013.01); *H01L 24/16* (2013.01); *H04B 1/036* (2013.01); *H04B 1/04* (2013.01); *H01L 2223/6611* (2013.01); *H01L 2223/6616* (2013.01); *H01L 2223/6661* (2013.01); *H01L 2224/09515* (2013.01); *H01L 2224/16227* (2013.01); *H01L 2924/1421* (2013.01); *H01L 2924/3025* (2013.01); *H04B 2001/0408* (2013.01)

(58) Field of Classification Search
  CPC ....... H01L 23/3677; H01L 23/66; H04B 1/04; H04B 1/036
  See application file for complete search history.

(56) References Cited

U.S. PATENT DOCUMENTS

2006/0186755 A1* 8/2006 Mori ...................... H05K 1/115
    310/313 R
2017/0317002 A1* 11/2017 Kitahara ............. H01L 23/3677

FOREIGN PATENT DOCUMENTS

JP       2019165167 A  *  9/2019
WO     2016/117196 A1     7/2016

* cited by examiner

HIGH-FREQUENCY MODULE AND COMMUNICATION DEVICE

CROSS REFERENCE TO RELATED APPLICATION

This is a continuation of International Application No. PCT/JP2021/046364 filed on Dec. 15, 2021 which claims priority from Japanese Patent Application No. 2020-214085 filed on Dec. 23, 2020. The contents of these applications are incorporated herein by reference in their entireties.

BACKGROUND OF THE DISCLOSURE

Field of the Disclosure

The present disclosure generally relates to a high-frequency module and a communication device, and more particularly relates to a high-frequency module provided with a filter which allows a high-frequency signal to pass therethrough, and a communication device having the high-frequency module.

Description of the Related Art

Conventionally, high-frequency modules which improve the heat dissipation properties of electronic components (for example, filters) are known (for example, see Patent Document 1).

A power amplification module (high-frequency module) disclosed in Patent Document 1 includes a substrate, a surface acoustic wave duplexer, an insulating resin, a conductive shield, and a first conductive part. The surface acoustic wave duplexer is mounted on the substrate, and the insulating resin covers the surface acoustic wave duplexer. The conductive shield covers a surface of the insulating resin. The first conductive part is provided on a surface of the surface acoustic wave duplexer and is electrically connected to the conductive shield.

Patent Document 1: International Publication No. 2016/117196

BRIEF SUMMARY OF THE DISCLOSURE

Meanwhile, the heat dissipation properties of electronic components such as a filter and a power amplifier may be insufficient.

The present disclosure is made in view of the above problem, and one possible benefit thereof is to provide a high-frequency module and a communication device capable of further improving a heat dissipation property of an electronic component.

A high-frequency module according to an aspect of the present disclosure includes a mounting substrate, a filter, a resin layer, a shielding layer, and a metal member. The mounting substrate has a first principal surface and a second principal surface opposed to each other. The filter is disposed at the first principal surface of the mounting substrate and configured to allow a high-frequency signal to pass therethrough. The resin layer is provided on a first principal surface side of the mounting substrate, and covers at least a portion of an outer peripheral surface of the filter. The shielding layer is provided to a surface of the resin layer on the opposite side from the mounting substrate, covers at least a portion of the resin layer, and is connected to a ground. The metal substrate is disposed at the first principal surface of the mounting substrate. The metal member is connected to a surface of the filter on the opposite side from the mounting substrate, the shielding layer, and the first principal surface of the mounting substrate.

A high-frequency module according to an aspect of the present disclosure includes a mounting substrate, a power amplifier, a resin layer, a shielding layer, and a metal member. The mounting substrate has a first principal surface and a second principal surface opposed to each other. The power amplifier is disposed at the first principal surface of the mounting substrate and configured to amplify a transmission signal that is a high-frequency signal. The resin layer is provided on a first principal surface side of the mounting substrate, and covers at least a portion of an outer peripheral surface of the power amplifier. The shielding layer is provided to a surface of the resin layer on the opposite side from the mounting substrate, covers at least a portion of the resin layer, and is connected to a ground. The metal member is disposed at the first principal surface of the mounting substrate. The metal member has a plate-shaped first member and a plate-shaped second member. The first member is provided between the power amplifier and the shielding layer. The second member intersects with the first member. The first member is connected to the power amplifier and the shielding layer.

A communication device according to an aspect of the present disclosure includes any of the above-described high-frequency modules, and a signal processing circuit configured to process the high-frequency signal that passes through the high-frequency module.

According to the present disclosure, a heat dissipation property of an electronic component such as a filter or a power amplifier can further be improved.

DETAILED DESCRIPTION OF THE DISCLOSURE

FIGS. 2 to 14 referred to in the following embodiments and the like are all schematic views, and ratios of sizes and

Embodiment 1

Hereinafter, a high-frequency module 1 and a communication device 500 according to Embodiment 1 are described with reference to FIGS. 1 to 3.

(1) Overview

Figure 1:
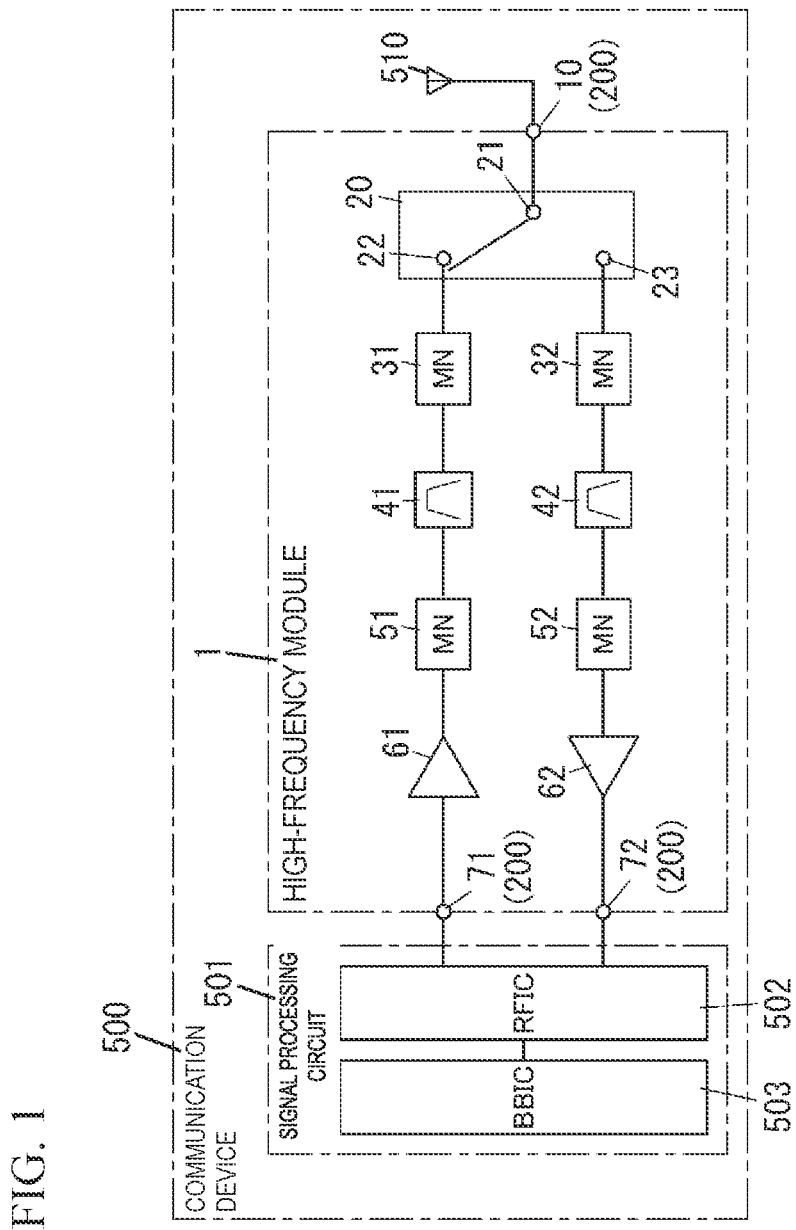
FIG. 1 is a schematic circuit diagram illustrating a high-frequency module according to Embodiment 1.

As illustrated in FIG. 1, the high-frequency module 1 includes an antenna terminal 10, a switch 20, a first matching circuit 31, a second matching circuit 32, a transmission filter 41, a reception filter 42, a third matching circuit 51, a fourth matching circuit 52, a power amplifier 61, and a low noise amplifier 62. As illustrated in FIGS. 2 and 3, the high-frequency module 1 further includes a mounting substrate 100, a shielding layer 110, a metal member 130, and a resin layer 120.

The transmission filter 41 is a filter which allows a transmission signal (high-frequency signal) in a given frequency band to pass therethrough. The reception filter 42 is a filter which allows a reception signal (high-frequency signal) in a given frequency band to pass therethrough. The mounting substrate 100 has a first principal surface 101 and a second principal surface 102 opposed to each other in a thickness direction D1 of the mounting substrate 100 (see FIG. 2).

The antenna terminal 10 (see FIG. 1) is electrically connected to an antenna 510 (see FIG. 1). Here, "being connected" intends to be linked electrically. That is, "the antenna terminal 10 is electrically connected to the antenna 510" intends that the antenna terminal 10 and the antenna 510 are electrically linked together.

The switch 20 is capable of connecting the transmission filter 41 and the reception filter 42 to the antenna 510. The switch 20 is capable of concurrently connecting the reception filter 42 and another reception filter (not illustrated) to the antenna 510. By the concurrent connection of the reception filter 42 and another reception filter, concurrent communication of the reception filter 42 and the other reception filter becomes possible. "Concurrent communication being possible" means that concurrent communication is possible in a frequency band in which concurrent communication is defined as possible by the long term evolution (LTE) standard of the third generation partnership project (3GPP). Note that the switch 20 may be capable of concurrently connecting the transmission filter 41 and another transmission filter (not illustrated) to the antenna 510.

The resin layer 120 is provided on a first principal surface 101 side of the mounting substrate 100, and covers at least a portion of an outer peripheral surface (side surface) of a filter. In Embodiment 1, the resin layer 120 covers an entire outer peripheral surface 41b of the transmission filter 41 and an entire outer peripheral surface of the reception filter 42.

Moreover, the resin layer 120 covers at least a portion of an outer peripheral surface (side surface) 61b of the power amplifier 61. In Embodiment 1, the resin layer 120 covers the entire outer peripheral surface 61b of the power amplifier 61.

The shielding layer 110 is provided to a surface of the resin layer 120 on the opposite side from the mounting substrate 100, and covers at least a portion of the resin layer 120. The shielding layer 110 is connected to a ground with a ground terminal 202 interposed therebetween.

The metal member 130 is disposed at the first principal surface 101 of the mounting substrate 100. The metal member 130 is connected to a surface of the filter (transmission filter 41) on the opposite side from the mounting substrate 100, the shielding layer 110, and the first principal surface 101 of the mounting substrate 100. Specifically, the metal member 130 is electrically connected at one end to the filter, and is electrically connected at the other end to the first principal surface 101 of the mounting substrate 100. The one end of the metal member 130 is electrically connected to a connection surface of the filter which is the surface on the opposite side from the mounting substrate 100. In Embodiment 1, the one end of the metal member 130 is electrically connected to a connection surface 41a of the transmission filter 41. Further, a portion of the metal member 130 is electrically connected to the shielding layer. Here, "being disposed" intends that an electronic component and the like which is a positioning target object is placed at a certain position. That is, "the metal member 130 being disposed at the first principal surface 101 of the mounting substrate 100" intends that the metal member 130 is disposed at a certain position on the first principal surface 101 of the mounting substrate 100. Moreover, as described above, "being connected" intends to be linked electrically. That is, "the metal member 130 being connected to the surface of the filter (transmission filter 41) on the opposite side from the mounting substrate 100, the shielding layer 110, and the first principal surface 101 of the mounting substrate 100" intends that the metal member 130 is electrically linked to each of the surface of the filter (transmission filter 41) on the opposite side from the mounting substrate 100, the shielding layer 110, and the first principal surface 101 of the mounting substrate 100.

In the high-frequency module 1, a plurality of electronic components are mounted on the first principal surface 101 or the second principal surface 102 of the mounting substrate 100. Here, "the electronic component being mounted on the first principal surface 101 (or the second principal surface 102) of the mounting substrate 100" includes that the electronic components is disposed at (mechanically connected to) the mounting substrate 100 and the electronic component is electrically connected to (a suitable conductor part of) the mounting substrate 100. Therefore, in the high-frequency module 1, each of the plurality of electronic components is disposed at the first principal surface 101 or the second principal surface 102 of the mounting substrate 100. The plurality of electronic components are not limited to components mounted on the mounting substrate 100, but may include circuit elements provided inside the mounting substrate 100. In FIG. 2, the illustration of the above-described conductor part of the mounting substrate 100 and a plurality of wires configured by via conductors and the like is omitted.

(2) Configuration

Configurations of the high-frequency module 1 and the communication device 500 according to Embodiment 1 are described below with reference to FIGS. 1 to 3.

The high-frequency module 1 according to Embodiment 1 is used for, for example, the communication device 500. The communication device 500 is, for example, a cellular phone (for example, a smartphone), but it is not limited to this. The communication device 500 may be, for example, a wearable terminal (for example, a smartwatch). The high-frequency module 1 is a module compatible with, for example, the 4th generation mobile communication system (4G) standard or the 5th generation mobile communication system (5G) standard. The 4G standard is, for example, the long term evolution (LTE) standard of the third generation partnership project (3GPP). The 5G standard is, for example, the 5G new radio (NR). The high-frequency module 1 is, for example, a module compatible with carrier aggregation and dual connectivity. Here, the carrier aggregation and the dual connectivity are communication concurrently using radio waves in a plurality of frequency bands.

The high-frequency module 1 is configured such that, for example, a transmission signal (high-frequency signal) inputted from a signal processing circuit 501 is amplified and outputted to the antenna 510. The high-frequency module 1 is configured such that, for example, a reception signal (high-frequency signal) inputted from the antenna 510 is amplified and outputted to the signal processing circuit 501. The signal processing circuit 501 is not a component of the high-frequency module 1, but is a component of the communication device 500 having the high-frequency module 1. The high-frequency module 1 is controlled by, for example, the signal processing circuit 501 provided to the communication device 500. The communication device 500 includes the high-frequency module 1 and the signal processing circuit 501. The communication device 500 further includes the antenna 510. The communication device 500 further includes a circuit board on which the high-frequency module 1 is mounted. The circuit board is a printed wiring board, for example. The circuit board has a ground electrode having a ground potential.

The signal processing circuit 501 processes signals (for example, a reception signal and a transmission signal) which pass the high-frequency module. The signal processing circuit 501 includes, for example, an RF signal processing circuit 502 and a baseband signal processing circuit 503. The RF signal processing circuit 502 is, for example, a radio frequency integrated circuit (RFIC) and performs signal processing to the high-frequency signal. For example, the RF signal processing circuit 502 performs signal processing such as upconversion to the high-frequency signal (transmission signal) outputted from the baseband signal processing circuit 503, and outputs the high-frequency signal applied with the signal processing. Moreover, for example, the RF signal processing circuit 502 performs signal processing such as downconversion to the high-frequency signal (reception signal) outputted from the high-frequency module 1, and outputs the high-frequency signal applied with the signal processing to the baseband signal processing circuit 503.

The baseband signal processing circuit 503 is, for example, a baseband integrated circuit (BBIC). The baseband signal processing circuit 503 generates an I-phase signal and a Q-phase signal based on a baseband signal. The baseband signal is, for example, an audio signal, an image signal, or the like inputted from outside. The baseband signal processing circuit 503 performs I/Q modulation processing by synthesizing the I-phase signal and the Q-phase signal, and outputs a transmission signal. At this time, the transmission signal is generated as a modulated signal (I/Q signal) in which a carrier signal at a given frequency is applied with amplitude modulation having a period longer than a period of the carrier signal. The reception signal processed by the baseband signal processing circuit 503 is used as, for example, an image signal for an image display or an audio signal for a call. The high-frequency module 1 according to Embodiment 1 transmits the high-frequency signals (the transmission signal and the reception signal) between the antenna 510 and the RF signal processing circuit 502 of the signal processing circuit 501.

As illustrated in FIG. 1, the high-frequency module 1 includes the antenna terminal 10, the switch 20, the first matching circuit 31, the second matching circuit 32, the transmission filter 41, the reception filter 42, the third matching circuit 51, the fourth matching circuit 52, the power amplifier 61, and the low noise amplifier 62. As illustrated in FIG. 1, the high-frequency module 1 further includes a signal input terminal 71 and a signal output terminal 72.

The antenna terminal 10 is electrically connected to the antenna 510.

The switch 20 is electrically connected to the antenna terminal 10. The switch 20 is electrically connected to the transmission filter 41 and the reception filter 42. Specifically, the switch 20 has a common terminal 21 and a plurality of (two in the illustrated example) selection terminals 22 and 23. The switch 20 is controlled by the signal processing circuit 501 to select at least one of the plurality of selection terminals 22 and 23 as a connection target of the common terminal 21. That is, the switch 20 selectively connects the antenna 510 to the transmission filter 41 and the reception filter 42. The common terminal 21 is electrically connected to the antenna terminal 10. That is, the common terminal 21 is electrically connected to the antenna 510 with the antenna terminal 10 interposed therebetween. Note that the common terminal 21 is not limited to be directly connected to the antenna 510. A filter, a coupler, or the like may be provided between the common terminal 21 and the antenna 510. The selection terminal 22 is electrically connected to the transmission filter 41. The selection terminal 23 is electrically connected to the reception filter 42.

The first matching circuit 31 is, for example, an inductor. The first matching circuit 31 is electrically connected in a path between the switch 20 and the transmission filter 41, and performs the impedance matching between the switch 20 and the transmission filter 41. The second matching circuit 32 is electrically connected in a path between the selection terminal 23 of the switch 20 and the reception filter 42, and performs the impedance matching between the switch 20 and the reception filter 42.

The transmission filter 41 is a filter which allows a transmission signal in a given frequency band inputted from the signal processing circuit 501 to pass therethrough. The transmission filter 41 is, for example, a ladder filter, and has a plurality of (for example, four) series-arm resonators and a plurality of (for example, three) parallel-arm resonators. The transmission filter 41 is, for example, an acoustic wave filter. In the acoustic wave filter, each of the plurality of series-arm resonators and the plurality of parallel-arm resonators is configured by an acoustic wave resonator. The acoustic wave filter is, for example, a surface acoustic wave filter utilizing a surface acoustic wave. In the surface acoustic wave filter, each of the plurality of series-arm resonators and the plurality of parallel-arm resonators is, for example, a surface acoustic wave (SAW) resonator. Note that the transmission filter 41 is not limited to the SAW filter. The transmission filter 41 may be, for example, a bulk acoustic wave (BAW) filter, other than the SAW filter. A resonator in the BAW filter is, for example, a film bulk acoustic resonator (FBAR) or a solidly mounted resonator (SMR). The BAW filter has a substrate. The substrate provided to the BAW filter is, for example, a silicon substrate.

The transmission filter 41 is electrically connected to the switch 20 with the first matching circuit 31 interposed therebetween. An input terminal of the transmission filter 41 is electrically connected to the third matching circuit 51, and an output terminal of the transmission filter 41 is electrically connected to the first matching circuit 31.

The reception filter 42 is a filter which allows a reception signal in a given frequency band received by the antenna 510 to pass therethrough. The reception filter 42 is, for example, a ladder filter, and has a plurality of (for example, four) series-arm resonators and a plurality of (for example, three) parallel-arm resonators. The reception filter 42 is, for example, an acoustic wave filter. In the acoustic wave filter, each of the plurality of series-arm resonators and the plurality of parallel-arm resonators is configured by an acoustic wave resonator. The acoustic wave filter is, for example, a surface acoustic wave filter utilizing a surface acoustic wave. In the surface acoustic wave filter, each of the plurality of series-arm resonators and the plurality of parallel-arm resonators is, for example, a SAW resonator. Note that the reception filter 42 is not limited to the SAW filter. The reception filter 42 may be, for example, a BAW filter, other than the SAW filter.

The reception filter 42 is electrically connected to the switch 20 with the second matching circuit 32 interposed therebetween. An input terminal of the reception filter 42 is electrically connected to the second matching circuit 32, and an output terminal of the reception filter 42 is electrically connected to the fourth matching circuit 52.

The third matching circuit 51 is electrically connected in a path between the transmission filter 41 and the power amplifier 61, and performs the impedance matching between the transmission filter 41 and the power amplifier 61. The fourth matching circuit 52 is electrically connected in a path between the reception filter 42 and the low noise amplifier 62, and performs the impedance matching between the reception filter 42 and the low noise amplifier 62.

The power amplifier 61 amplifies a transmission signal. An input terminal of the power amplifier 61 is electrically connected to the signal input terminal 71. An output terminal of the power amplifier 61 is electrically connected to the third matching circuit 51.

The low noise amplifier 62 amplifies a reception signal. An input terminal of the low noise amplifier 62 is electrically connected to the fourth matching circuit 52. An output terminal of the low noise amplifier 62 is electrically connected to the signal output terminal 72.

The signal input terminal 71 is connected to the RF signal processing circuit 502. That is, the power amplifier 61 is electrically connected to the RF signal processing circuit 502 with the signal input terminal 71 interposed therebetween.

The signal output terminal 72 is connected to the RF signal processing circuit 502. That is, the low noise amplifier 62 is electrically connected to the RF signal processing circuit 502 with the signal output terminal 72 interposed therebetween.

Figure 2:
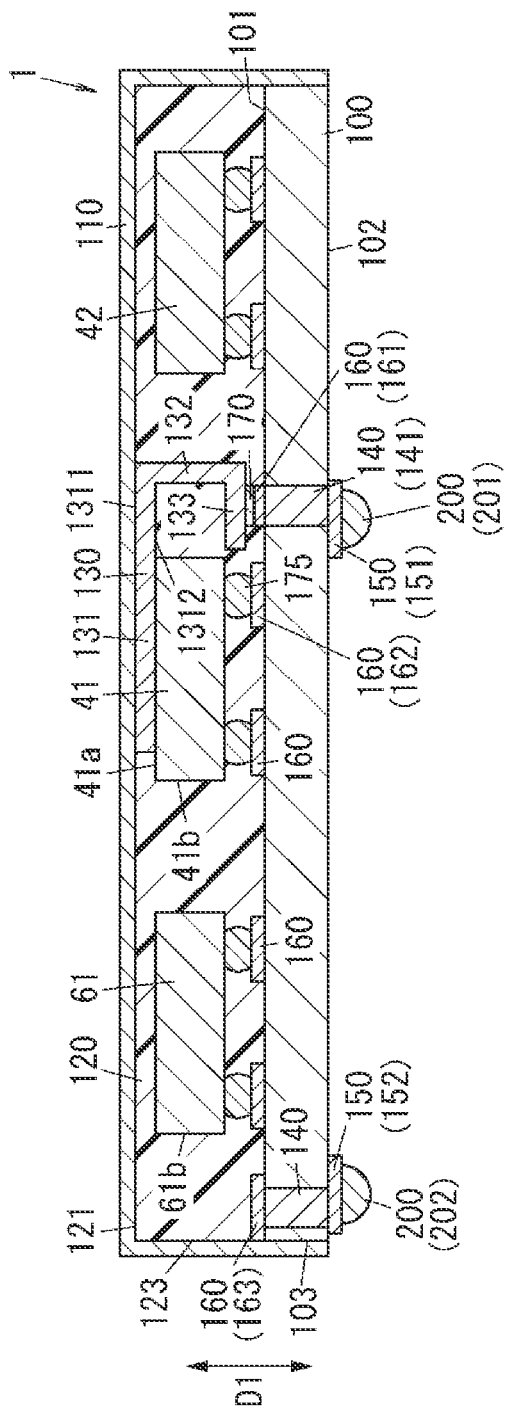
FIG. 2 is a sectional view of the high-frequency module.
Figure 3:
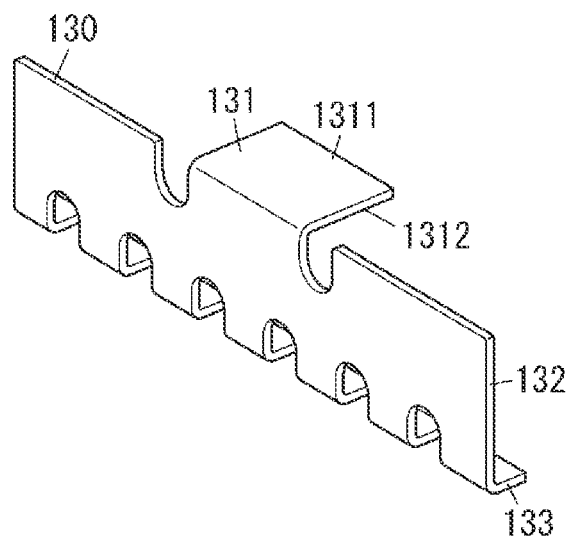
FIG. 3 is a perspective view of a metal member provided to the high-frequency module.

The high-frequency module 1 further includes the mounting substrate 100, a plurality of (two in the illustrated example) external connection terminals 200, the resin layer 120, the shielding layer 110, and the metal member 130 (see FIG. 2).

The mounting substrate 100 has the first principal surface 101 and the second principal surface 102 opposed to each other in the thickness direction D1 of the mounting substrate 100. The mounting substrate 100 has a plurality of (two in the illustrated example) first pads 150 and a plurality of (eight in the illustrated example) second pads 160.

The mounting substrate 100 is, for example, a printed wiring board, a low temperature co-fired ceramics (LTCC) substrate, a high temperature co-fired ceramics (HTCC) substrate, or a resin multilayer substrate. Here, the mounting substrate 100 is, for example, a multilayer substrate including a plurality of dielectric layers and a plurality of conductive layers, and is a ceramic substrate. The plurality of dielectric layers and the plurality of conductive layers are laminated in the thickness direction D1 of the mounting substrate 100. Each of the plurality of conductive layers is formed in a given pattern determined for the layer. Each conductive layer includes one or a plurality of conductor parts in the same plane orthogonal to the thickness direction D1 of the mounting substrate 100. Material of each conductive layer is copper, for example. The plurality of conductive layers include a ground layer. In the high-frequency module 1, one or more ground terminals included in the plurality of external connection terminals 200 (see FIG. 2) and the ground layer are electrically connected to each other with via conductors 140, the first pads 150, and the like, provided to the mounting substrate 100, interposed therebetween. In FIG. 2, two ground terminals 201 and 202 of the plurality of ground terminals are electrically connected to the ground layer.

The mounting substrate 100 is not limited to the printed wiring board or the LTCC substrate, but may be a wiring structure. The wiring structure is a multilayer structure, for example. The multilayer structure includes at least one insulating layer and at least one conductive layer. The insulating layer is formed in a given pattern. When the insulating layer includes a plurality of insulating layers, each of the plurality of insulating layers is formed in a given pattern determined for the layer. The conductive layer is formed in a given pattern different from the given pattern of the insulating layer. When the conductive layer includes a plurality of conductive layers, each of the plurality of conductive layers is formed in a given pattern determined for the layer. The conductive layer may include one or a plurality of redistribution parts. In the wiring structure, among two surfaces opposed to each other in a thickness direction of the multilayer structure, a first surface is the first principal surface 101 of the mounting substrate 100, and a second surface is the second principal surface 102 of the mounting substrate 100. The wiring structure may be an interposer, for example. The interposer may be an interposer using a silicon substrate, or a multilayer substrate.

The first principal surface 101 and the second principal surface 102 of the mounting substrate 100 are separate from each other in the thickness direction D1 of the mounting substrate 100, and intersect with the thickness direction D1 of the mounting substrate 100. Although, for example, the first principal surface 101 of the mounting substrate 100 is orthogonal to the thickness direction D1 of the mounting substrate 100, it may include a side surface of the conductor part and the like, as a surface which is not orthogonal to the thickness direction D1. Moreover, although, for example, the second principal surface 102 of the mounting substrate 100 is orthogonal to the thickness direction D1 of the mounting substrate 100, it may include a side surface of the conductor part and the like, as a surface which is not orthogonal to the thickness direction D1. Further, the first principal surface 101 and the second principal surface 102 of the mounting substrate 100 may have extremely small unevenness, a concave portion, or a convex portion. When seen in plan view in the thickness direction D1 of the mounting substrate 100, although the mounting substrate 100 has a rectangular shape, the shape is not limited to this, and it may have a square shape, for example.

The high-frequency module 1 includes, as a plurality of electronic components, the switch 20, the first matching circuit 31, the second matching circuit 32, the transmission filter 41, the reception filter 42, the third matching circuit 51, the fourth matching circuit 52, the power amplifier 61, and the low noise amplifier 62.

Each of the plurality of electronic components of the high-frequency module 1 is mounted on the first principal surface 101 or the second principal surface 102 of the mounting substrate 100. In Embodiment 1, each of the plurality of electronic components of the high-frequency module 1 is mounted on the first principal surface 101.

The plurality of external connection terminals 200 are disposed at the second principal surface 102 of the mounting substrate 100. More specifically, the plurality of external connection terminals 200 are disposed at the second principal surface 102 of the mounting substrate 100 with the first pads 150 interposed therebetween. Material of the plurality of external connection terminals 200 is, for example, metal (for example, copper or copper alloy). Each of the plurality of external connection terminals 200 is a solder bump.

The plurality of external connection terminals 200 include the antenna terminal 10, one or more ground terminals, the signal input terminal 71, and the signal output terminal 72. The one or more ground terminals are connected to the ground layer of the mounting substrate 100 as described above. The ground layer is a circuit ground of the high-frequency module 1, and the plurality of electronic components of the high-frequency module 1 include an electronic component connected to the ground layer.

The resin layer 120 covers, on the first principal surface 101 side of the mounting substrate 100, the plurality of electronic components disposed at the first principal surface 101 of the mounting substrate 100. Here, the resin layer 120 seals the plurality of electronic components disposed at the first principal surface 101 of the mounting substrate 100. The resin layer 120 includes resin (for example, epoxy resin). The resin layer 120 may include a filler in addition to the resin.

The shielding layer 110 covers at least a portion of the resin layer 120 (see FIG. 2). Further, the shielding layer 110 covers at least a portion of the metal member 130 (see FIG. 2). The shielding layer 110 has conductivity. Although the shielding layer 110 has a multilayer structure having a plurality of laminated metal layers, it is not limited to this, and it may have a single metal layer. The metal layer includes one type or a plurality of types of metal. The shielding layer 110 covers a principal surface 121 of the resin layer 120 on the opposite side from the mounting substrate 100 side, an outer peripheral surface (side surface) 123 of the resin layer 120, and an outer peripheral surface (side surface) 103 of the mounting substrate 100. The shielding layer 110 is electrically connected to a second pad 163 of the plurality of second pads 160 provided to the mounting substrate 100. The second pad 163 is electrically connected to a first pad 152 of the plurality of first pads 150 with the via conductor 140 interposed therebetween. The first pad 152 is electrically connected to the external connection terminal 200 which is the ground terminal 202. Therefore, a potential of the shielding layer 110 can be made to the same as a potential of the ground layer. That is, the shielding layer 110 can be connected to the ground.

The metal member 130 is electrically connected at one end to the filter, and is electrically connected at the other end to the first principal surface 101 of the mounting substrate 100. In Embodiment 1, the metal member 130 is electrically connected at one end to the transmission filter 41, and is electrically connected at the other end to the first principal surface 101 of the mounting substrate 100. The one end of the metal member 130 is electrically connected to the connection surface 41a of the transmission filter 41 which is the surface on the opposite side from the mounting substrate 100. A portion of the metal member 130 is electrically connected to the shielding layer 110.

The metal member 130 has a portion disposed between the filter and the electronic component disposed at the first principal surface 101 of the mounting substrate 100 when seen in plan view in the thickness direction D1 of the mounting substrate 100. In Embodiment 1, the metal member 130 has a portion disposed between the transmission filter 41 and the reception filter 42 disposed at the first principal surface 101 of the mounting substrate 100 when seen in plan view in the thickness direction D1 of the mounting substrate 100.

The metal member 130 has conductivity. As illustrated in FIGS. 2 and 3, the metal member 130 has a plate-shaped first member 131, a plate-shaped second member 132, and a plate-shaped third member 133. In Embodiment 1, the thicknesses of the first member 131, the second member 132, and the third member 133 are the same. Here, "the thicknesses being the same" includes not only being completely the same but also falling within a permissible margin of error.

The first member 131 is provided between the transmission filter 41 which is the filter and the shielding layer 110 in the thickness direction D1 of the mounting substrate 100. The first member 131 is directly connected to a pad (not illustrated) provided to the connection surface 41a. Further, the first member 131 is electrically connected to the shielding layer 110. More specifically, among two surfaces 1311 and 1312 of the first member 131 opposed to each other in the thickness direction D1, the surface 1312 closer to the mounting substrate 100 is electrically connected to the pad provided to the connection surface 41a of the transmission filter 41. Among the two surfaces of the first member 131 opposed to each other in the thickness direction D1, the surface 1311 on the opposite side from the mounting substrate 100 is electrically connected to the shielding layer 110.

The second member 132 intersects with the first member 131 and is coupled to the first member 131. The second member 132 is provided along the thickness direction D1 (see FIG. 2). That is, the first member 131 projects from an end portion (an upper end in FIG. 3) of the second member 132 in a direction intersecting with the thickness direction D1. The second member 132 is disposed between the transmission filter 41 and the reception filter 42 as the electronic component. That is, a portion of the metal member 130 disposed between the transmission filter 41 and the reception filter 42 as the electronic component includes at least a portion of the second member 132.

The third member 133 projects from an end portion of the second member 132. Specifically, the third member 133 projects in the direction intersecting with the thickness direction D1 from an end portion (a lower end in FIG. 3) different from the end portion (the upper end in FIG. 3) coupled to the first member 131 among both end portions of the second member 132 in the thickness direction D1 of the mounting substrate 100. When seen in plan view in the thickness direction D1 of the mounting substrate 100, the third member 133 projects in the same direction as the projecting direction of the first member 131 with respect to the second member 132. The third member 133 is electrically connected to the first principal surface 101 of the mounting substrate 100 with a solder 170 interposed therebetween. Specifically, the third member 133 is electrically connected to a second pad 161 of the plurality of second pads 160 provided to the first principal surface 101, with the solder 170 interposed therebetween. Here, the second pad 161 is electrically connected to a first pad 151 of the plurality of first pads 150, with a via conductor 141 of the plurality of via conductors 140 interposed therebetween. That is, the third member 133 is electrically connected to the first pad 151.

Here, as described above, the mounting substrate 100 has the plurality of pads (here, the second pads 160) disposed at the first principal surface 101 of the mounting substrate 100. The transmission filter 41 which is the filter is electrically connected to one or more second pads 161 of the plurality of second pads 160 with a solder bump 175 interposed therebetween. When seen in plan view in the thickness direction D1 of the mounting substrate 100, an area of the first member 131 is larger than an area of a second pad 162.

The metal member 130 is electrically connected to the ground terminal 201 which is the external connection terminal 200 connected to the ground, among the plurality of external connection terminals 200. More specifically, the third member 133 of the metal member 130 is electrically connected to the ground terminal 201 electrically connected to the first part 151.

In this configuration, the transmission filter 41 is connected to the ground with the shielding layer 110 interposed therebetween, and is also connected to the ground with the metal member 130 interposed therebetween. That is, the high-frequency module 1 can increase the number of paths through which the transmission filter 41 is connected to the ground.

(3) Effects

As described above, the high-frequency module 1 in Embodiment 1 includes the mounting substrate 100, the filter (for example, the transmission filter 41), the resin layer 120, the shielding layer 110, and the metal member 130. The mounting substrate 100 has the first principal surface 101 and the second principal surface 102 opposed to each other. The filter is disposed at the first principal surface 101 of the mounting substrate 100, and allows a high-frequency signal to pass therethrough. The resin layer 120 is provided on the first principal surface 101 side of the mounting substrate 100, and covers at least a portion of the outer peripheral surface (for example, the outer peripheral surface 41b) of the filter. The shielding layer 110 is provided to the surface of the resin layer 120 on the opposite side from the mounting substrate 100, covers at least a portion of the resin layer 120, and is connected to the ground. The metal member 130 is disposed at the first principal surface 101 of the mounting substrate 100. The metal member 130 is connected to the surface of the filter on the opposite side from the mounting substrate 100, the shielding layer 110, and the first principal surface 101 of the mounting substrate 100.

In this configuration, the filter is connected to the ground with the shielding layer 110 interposed therebetween, and is also connected to the ground with the metal member 130 interposed therebetween. That is, in the high-frequency module 1, the number of heat dissipation paths increases. Therefore, a heat dissipation property of the electronic component such as the filter can further be improved.

Moreover, since both of the shielding layer 110 and the metal member 130 are connected to the ground, in both of the path from the shielding layer 110 to the ground and the path from the metal member 130 to the ground, the heat dissipation characteristics can be improved.

The high-frequency module 1 further includes the electronic component (for example, the reception filter 42) disposed at the first principal surface 101 of the mounting substrate 100. When seen in plan view in the thickness direction D1 of the mounting substrate 100, the metal member 130 has the portion (for example, the second member 132) disposed between the filter and the electronic component.

In this configuration, the isolation between the filter and the electronic component during communication can be improved.

(4) Modifications

Modifications of Embodiment 1 are described below.

(4.1) Modification 1

Although, in Embodiment 1, the first member 131 of the metal member 130 is directly connected to the pad provided to the connection surface 41a of the transmission filter 41, the configuration is not limited to this. The transmission filter 41 and the first member 131 may electrically be connected to each other with another member having conductivity interposed therebetween. A high-frequency module 1A according to Modification 1 is described below with reference to FIG. 4. Note that, in Modification 1, the same reference characters are given to components similar to the high-frequency module 1 according to Embodiment 1 and description thereof is omitted as appropriate.

Figure 4:
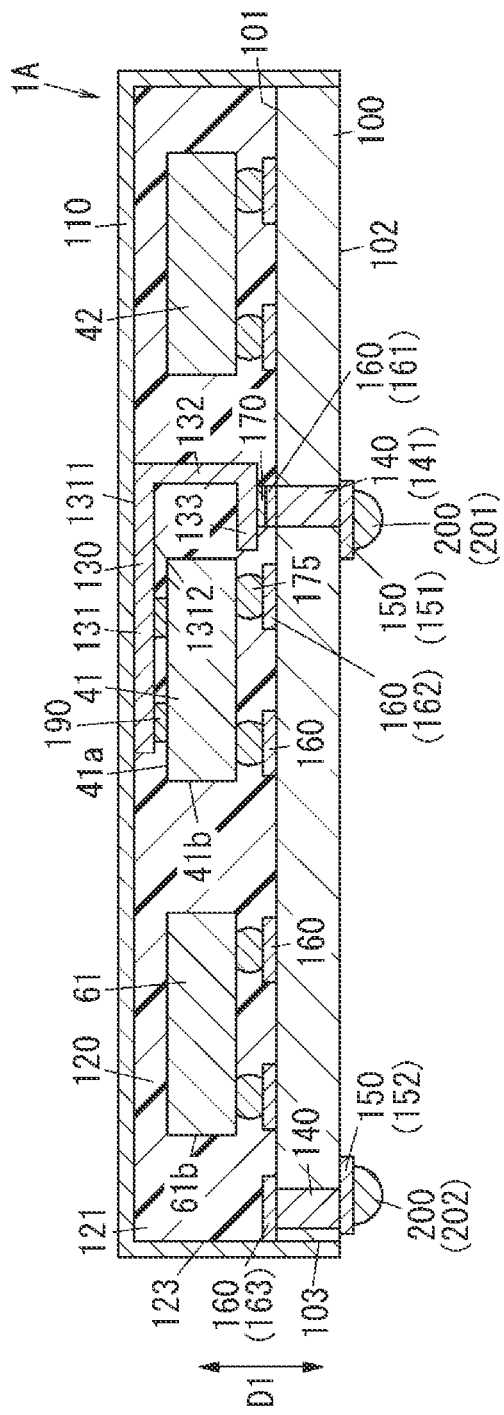
FIG. 4 is a sectional view of a high-frequency module according to Modification 1 of Embodiment 1.

In the high-frequency module 1A according to Modification 1, the transmission filter 41 and the first member 131 of the metal member 130 are electrically connected to each other with a solder 190 interposed therebetween (see FIG. 4). More specifically, the solder 190 electrically connects the pad (not illustrated in FIG. 4) provided to the connection surface 41a of the transmission filter 41 to the surface 1312 closer to the mounting substrate 100 among the two surfaces 1311 and 1312 of the first member 131 opposed to each other in the thickness direction D1 of the mounting substrate 100.

Also in Modification 1, a heat dissipation property of the electronic component such as the filter can further be improved.

(4.2) Modification 2

Although, in Embodiment 1, the thicknesses of the first member 131, the second member 132, and the third member 133 of the metal member 130 are the same, the configuration is not limited to this. A high-frequency module 1B according to Modification 2 is described below with reference to FIG. 5. Note that, in Modification 2, the same reference characters are given to components similar to the high-frequency module 1 according to Embodiment 1 and description thereof is omitted as appropriate.

The high-frequency module 1B according to Modification 2 is provided with, instead of the metal member 130 provided to the high-frequency module 1, a metal member 130b which is another metal member.

As with the metal member 130 in Embodiment 1, the metal member 130b is electrically connected at one end to the transmission filter 41, and is electrically connected at the other end to the first principal surface 101 of the mounting substrate 100. Moreover, a portion of the metal member 130b is electrically connected to the shielding layer 110. When the mounting substrate 100 is seen in plan view, the metal member 130b has a portion disposed between the transmission filter 41 and the reception filter 42 disposed at the first principal surface 101 of the mounting substrate 100.

Figure 5:
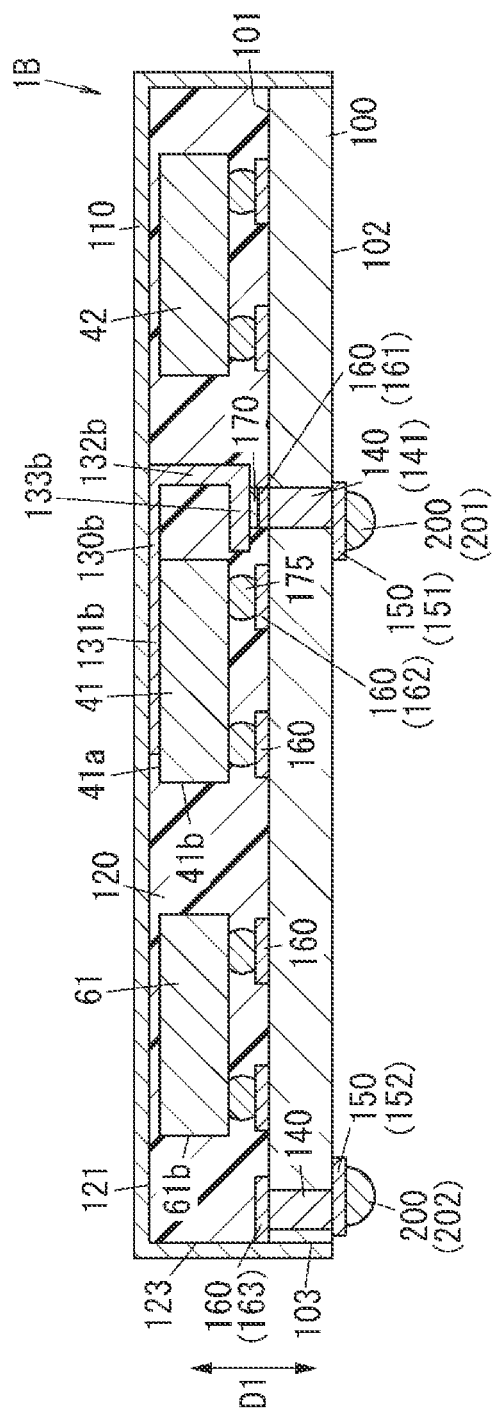
FIG. 5 is a sectional view of a high-frequency module according to Modification 2 of Embodiment 1.

The metal member 130b has conductivity. As illustrated in FIG. 5, the metal member 130b has a plate-shaped first member 131b, a plate-shaped second member 132b, and a plate-shaped third member 133b. The thicknesses of the second member 132b and the third member 133b are the same. The thickness of the first member 131b is thinner than each of the thicknesses of the second member 132b and the third member 133b.

As with the first member 131 in Embodiment 1, the first member 131b is directly connected to the pad (not illustrated) provided to the connection surface 41a. Moreover, the first member 131b is electrically connected to the shielding layer 110.

The second member 132b intersects with the first member 131b and is coupled to the first member 131b. The second member 132b is provided along the thickness direction D1 of the mounting substrate 100 (see FIG. 5). That is, the first member 131b projects in the direction intersecting with the thickness direction D1. The second member 132b is disposed between the transmission filter 41 and the reception filter 42. That is, a portion of the metal member 130b disposed between the transmission filter 41 and the reception filter 42 includes at least the second member 132b.

The third member 133b projects from, among both end portions of the second member 132b in the thickness direction D1 of the mounting substrate 100, an end portion different from an end portion coupled to the first member 131b. When seen in plan view in the thickness direction D1 of the mounting substrate 100, the third member 133b projects from the second member 132b in the same direction as the projecting direction of the first member 131b with respect to the second member 132b. The third member 133b is electrically connected to the second pad 161 of the plurality of the second pads 160 provided to the first principal surface 101 of the mounting substrate 100, with the solder 170 interposed therebetween.

Also in Modification 2, a heat dissipation property of the electronic component such as the filter can further be improved.

(4.3) Modification 3

Although, in Embodiment 1, the metal member 130 has the first member 131, the second member 132, and the third member 133, the configuration is not limited to this. A high-frequency module 1C according to Modification 3 is described below with reference to FIG. 6. Note that, in Modification 3, the same reference characters are given to components similar to the high-frequency module 1 according to Embodiment 1 and description thereof is omitted as appropriate.

The high-frequency module 1C according to Modification 3 is provided with, instead of the metal member 130 provided to the high-frequency module 1, a metal member 130c which is another metal member.

The metal member 130c is electrically connected at one end to the transmission filter 41, and is electrically connected at the other end to the first principal surface 101 of the mounting substrate 100. The one end of the metal member 130c is electrically connected to the connection surface 41a of the transmission filter 41 which is the surface on the opposite side from the mounting substrate 100. A portion of the metal member 130c is electrically connected to the shielding layer 110.

When seen in plan view in the thickness direction D1 of the mounting substrate 100, the metal member 130c has a portion disposed between the transmission filter 41 and the reception filter 42 disposed at the first principal surface 101 of the mounting substrate 100.

Figure 6:
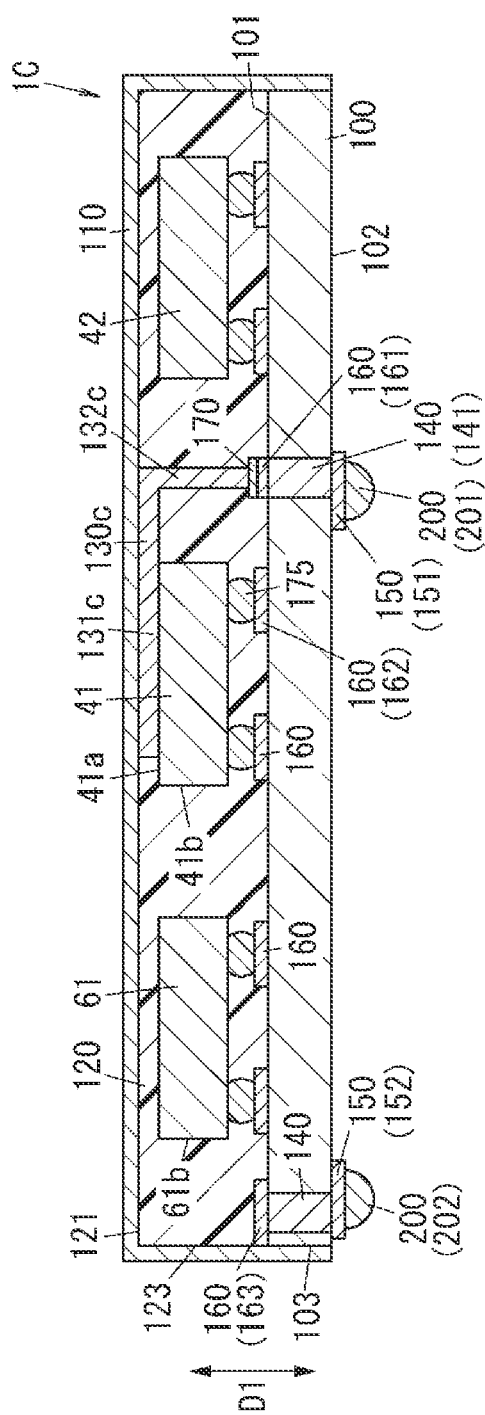
FIG. 6 is a sectional view of a high-frequency module according to Modification 3 of Embodiment 1.

The metal member 130c has conductivity. As illustrated in FIG. 6, the metal member 130c has a plate-shaped first member 131c and a plate-shaped second member 132c. In Modification 3, the thicknesses of the first member 131c and the second member 132c are the same.

The first member 131c is directly connected to the pad (not illustrated) provided to the connection surface 41a of the transmission filter 41. Moreover, the first member 131c is electrically connected to the shielding layer 110.

The second member 132c intersects with the first member 131c and is coupled to the first member 131c. The second member 132c is provided along the thickness direction D1 of the mounting substrate 100 (see FIG. 6). That is, the first member 131c projects from the second member 132c in the direction intersecting with the thickness direction D1. The second member 132c is disposed between the transmission filter 41 and the reception filter 42 as the electronic component. That is, a portion of the metal member 130c disposed between the transmission filter 41 and the reception filter 42 includes at least the second member 132c. Among both end portions of the second member 132 in the thickness direction D1, an end portion different from an end portion coupled to the first member 131 is electrically connected to the first principal surface 101 of the mounting substrate 100 with the solder 170 interposed therebetween. Specifically, the second member 132 is electrically connected to the second pad 161 provided to the first principal surface 101 of the mounting substrate 100, with the solder 170 interposed therebetween.

Also in Modification 3, a heat dissipation property of the electronic component such as the filter can further be improved.

(4.4) Modification 4

Although, in Embodiment 1, the first member 131 of the metal member 130 has a plate shape, the configuration is not limited to this. A high-frequency module 1D according to Modification 4 is described below with reference to FIG. 7. Note that, in Modification 4, the same reference characters are given to components similar to the high-frequency module 1 according to Embodiment 1 and description thereof is omitted as appropriate.

The high-frequency module 1D according to Modification 4 is provided with, instead of the metal member 130 provided to the high-frequency module 1, a metal member 130d which is another metal member.

The metal member 130d is electrically connected at one end to the transmission filter 41, and is electrically connected at the other end to the first principal surface 101 of the mounting substrate 100. The one end of the metal member 130d is electrically connected to the connection surface 41a of the transmission filter 41 which is the surface on the opposite side from the mounting substrate 100. A portion of the metal member 130d is electrically connected to the shielding layer 110.

When seen in plan view in the thickness direction D1 of the mounting substrate 100, the metal member 130d has a portion disposed between the transmission filter 41 and the reception filter 42 disposed at the first principal surface 101 of the mounting substrate 100.

Figure 7:
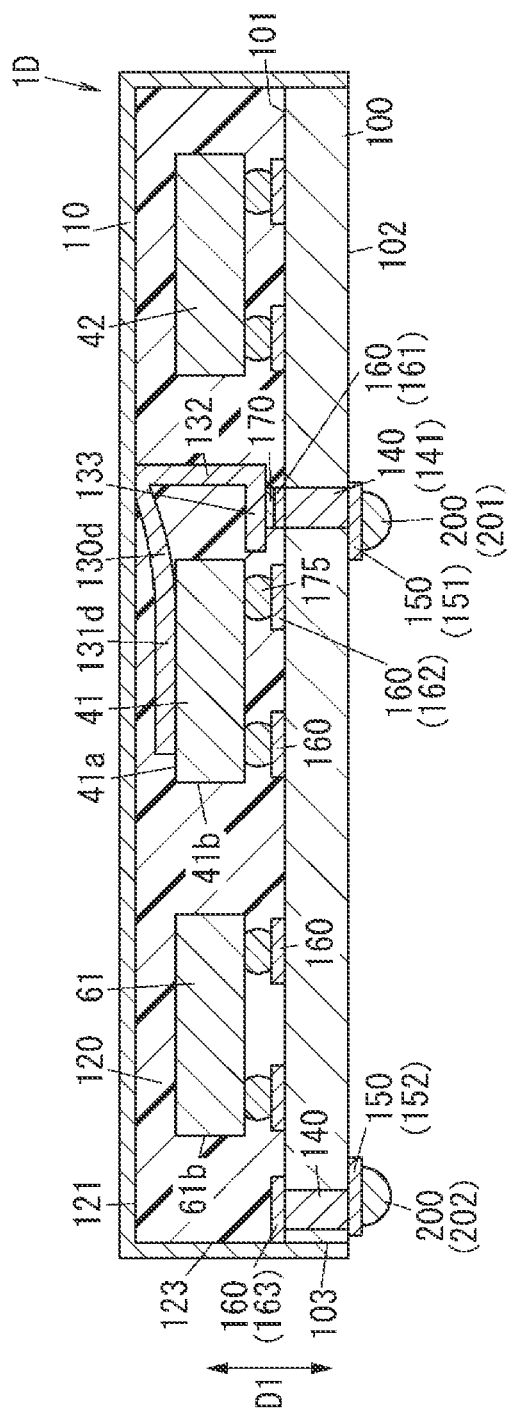
FIG. 7 is a sectional view of a high-frequency module according to Modification 4 of Embodiment 1.

The metal member 130d has conductivity. As illustrated in FIG. 7, the metal member 130d has a first member 131d, the plate-shaped second member 132, and the plate-shaped third member 133.

The first member 131d is formed having a spring shape in a state before being covered by the resin layer 120 (see FIG. 7). The first member 131d is directly connected to the pad (not illustrated) provided to the connection surface 41a of the transmission filter 41.

The second member 132 intersects with the first member 131d, and is coupled to the first member 131d. In Modification 4, a portion where the first member 131d and the second member 132 couple to each other is electrically connected to the shielding layer 110.

By the first member 131*d* having the spring shape, various transmission filters 41 with different thicknesses can be connected to the metal member 130*d* when manufacturing the high-frequency module 1D.

Moreover, also in Modification 4, a heat dissipation property of the electronic component such as the filter can further be improved.

(4.5) Modification 5

Although, in Embodiment 1, the plurality of electronic components provided to the high-frequency module 1 are mounted on the first principal surface 101 of the mounting substrate 100, the configuration is not limited to this.

At least one of the plurality of electronic components may be provided to the second principal surface 102 of the mounting substrate 100. A high-frequency module 1E according to Modification 5 is described below with reference to FIG. 8. Note that, in Modification 5, the same reference characters are given to components similar to those according to Embodiment 1 and description thereof is omitted as appropriate.

As with the high-frequency module 1 in Embodiment 1, the high-frequency module 1E includes, as the plurality of electronic components, the switch 20, the first matching circuit 31, the second matching circuit 32, the transmission filter 41, the reception filter 42, the third matching circuit 51, the fourth matching circuit 52, the power amplifier 61, and the low noise amplifier 62, which are illustrated in FIG. 1. As with the high-frequency module 1 in Embodiment 1, the high-frequency module 1E further includes the signal input terminal 71 and the signal output terminal 72 illustrated in FIG. 1.

Figure 8:
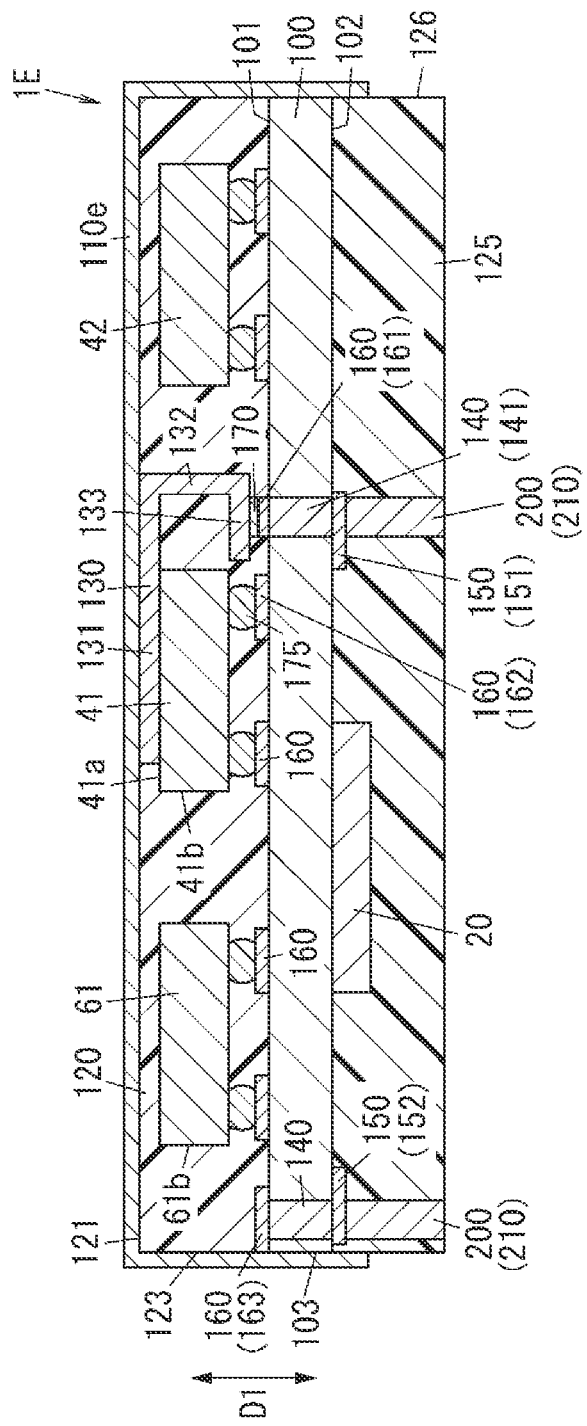
FIG. 8 is a sectional view of a high-frequency module according to Modification 5 of Embodiment 1.

As illustrated in FIG. 8, the high-frequency module 1E further includes the mounting substrate 100, a plurality of (two in the illustrated example) external connection terminals 210 as the external connection terminals 200, a first resin layer 120 as the resin layer 120, a second resin layer 125, a shielding layer 110*e*, and the metal member 130.

The plurality of external connection terminals 210 are configured by pillar-shaped electrodes, and include the antenna terminal 10, one or more ground terminals, the signal input terminal 71, and the signal output terminal 72. The one or more ground terminals are connected to the ground layer of the mounting substrate 100 as described above. The ground layer is a circuit ground of the high-frequency module 1E, and the plurality of electronic components of the high-frequency module 1E include the electronic component connected to the ground layer. Note that the two external connection terminals 210 illustrated in FIG. 8 are the ground terminals.

The switch 20 is disposed at the second principal surface 102 of the mounting substrate 100 (see FIG. 8).

The second resin layer 125 is disposed at the second principal surface 102 of the mounting substrate 100. The second resin layer 125 covers, on the second principal surface 102 side of the mounting substrate 100, the plurality of electronic components mounted on the second principal surface 102 of the mounting substrate 100 and a portion of each of the plurality of external connection terminals 210. The second resin layer 125 is formed such that a tip-end surface of each of the plurality of external connection terminals 210 is exposed. The second resin layer 125 includes resin (for example, epoxy resin). The second resin layer 125 may include a filler in addition to the resin. The material of the second resin layer 125 may be the same as or different from the material of the first resin layer 120.

The shielding layer 110*e* covers the first resin layer 120, the transmission filter 41, the reception filter 42, and the power amplifier 61 (see FIG. 8). The shielding layer 110*e* has conductivity. As with the shielding layer 110 in Embodiment 1, the shielding layer 110*e* has a multilayer structure having a plurality of laminated metal layers, but it is not limited to this. The shielding layer 110*e* may have a single metal layer. The metal layer includes one type or a plurality of types of metal. The shielding layer 110*e* covers the principal surface 121 of the first resin layer 120 on the opposite side from the mounting substrate 100 side, the outer peripheral surface (side surface) 123 of the first resin layer 120, and the outer peripheral surface (side surface) 103 of the mounting substrate 100. Moreover, the shielding layer 110*e* covers at least a portion of an outer peripheral surface 126 of the second resin layer 125. In Modification 5, the shielding layer 110*e* covers a portion of the outer peripheral surface 126 of the second resin layer 125. The shielding layer 110*e* is electrically connected to the first pad 152 with the second pad 163 and the via conductor 140 interposed therebetween. The first pad 152 is electrically connected to the external connection terminal 210 which is the ground terminal. Therefore, a potential of the shielding layer 110*e* can be made to the same as the potential of the ground layer.

Also in Modification 5, a heat dissipation property of the electronic component such as the filter can further be improved.

(4.6) Modification 6

Figure 9:
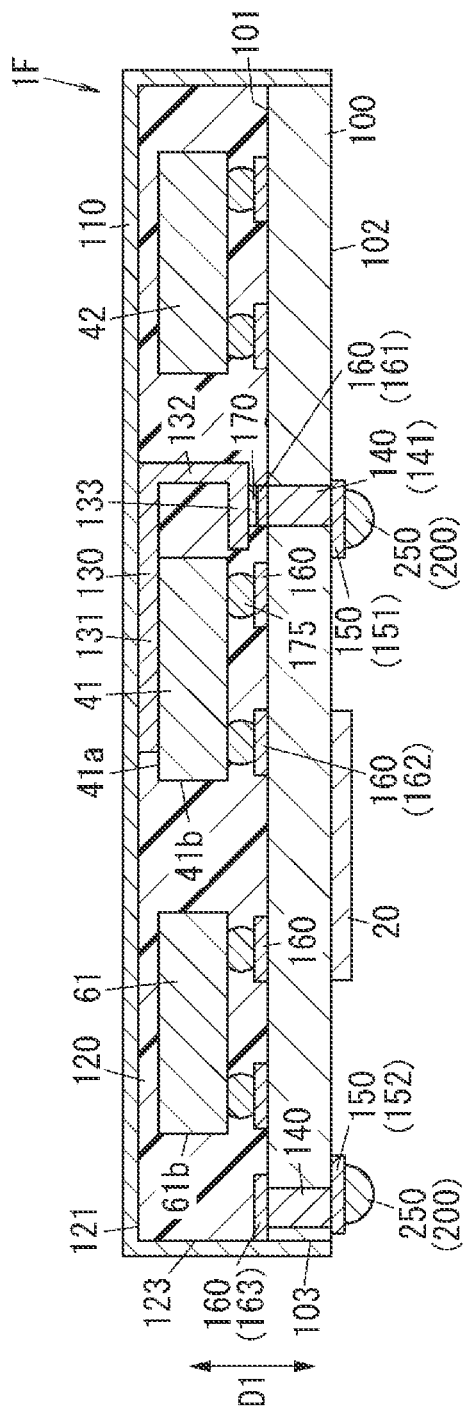
FIG. 9 is a sectional view of a high-frequency module according to Modification 6 of Embodiment 1.

A high-frequency module 1F according to Modification 6 is described with reference to FIG. 9. Regarding the high-frequency module 1F according to Modification 6, the same reference characters are given to components similar to the high-frequency module 1E according to Modification 5, and description thereof is omitted as appropriate.

The high-frequency module 1F according to Modification 6 is different from the high-frequency module 1E according to Modification 5 in that the external connection terminal 210 as the plurality of external connection terminals 200 is a ball bump 250. Moreover, the high-frequency module 1F according to Modification 6 is different from the high-frequency module 1E according to Modification 5 in that it is not provided with the second resin layer 125 of the high-frequency module 1E in Modification 5. The high-frequency module 1F according to Modification 6 may include an underfill part provided to a gap between the switch 20 and the second principal surface 102 of the mounting substrate 100.

Material of the ball bump 250 constituting each of the plurality of external connection terminals 210 is, for example, gold, copper, or a solder.

The plurality of external connection terminals 210 may be the combination of the external connection terminal 210 configured by the ball bump 250 and the external connection terminal 210 configured by the pillar-shaped electrode.

Also in Modification 6, a heat dissipation property of the electronic component such as the filter can further be improved.

(4.7) Modification 7

Although, in Embodiment 1, the metal member 130 has the plate-shaped first member 131, the plate-shaped second member 132, and the plate-shaped third member 133, the configuration is not limited to this.

The metal member 130 may be a wire. A high-frequency module 1G according to Modification 7 is described below with reference to FIG. 10. Note that, in Modification 7, the same reference characters are given to components similar to the high-frequency module 1 according to Embodiment 1 and description thereof is omitted as appropriate.

Figure 10:
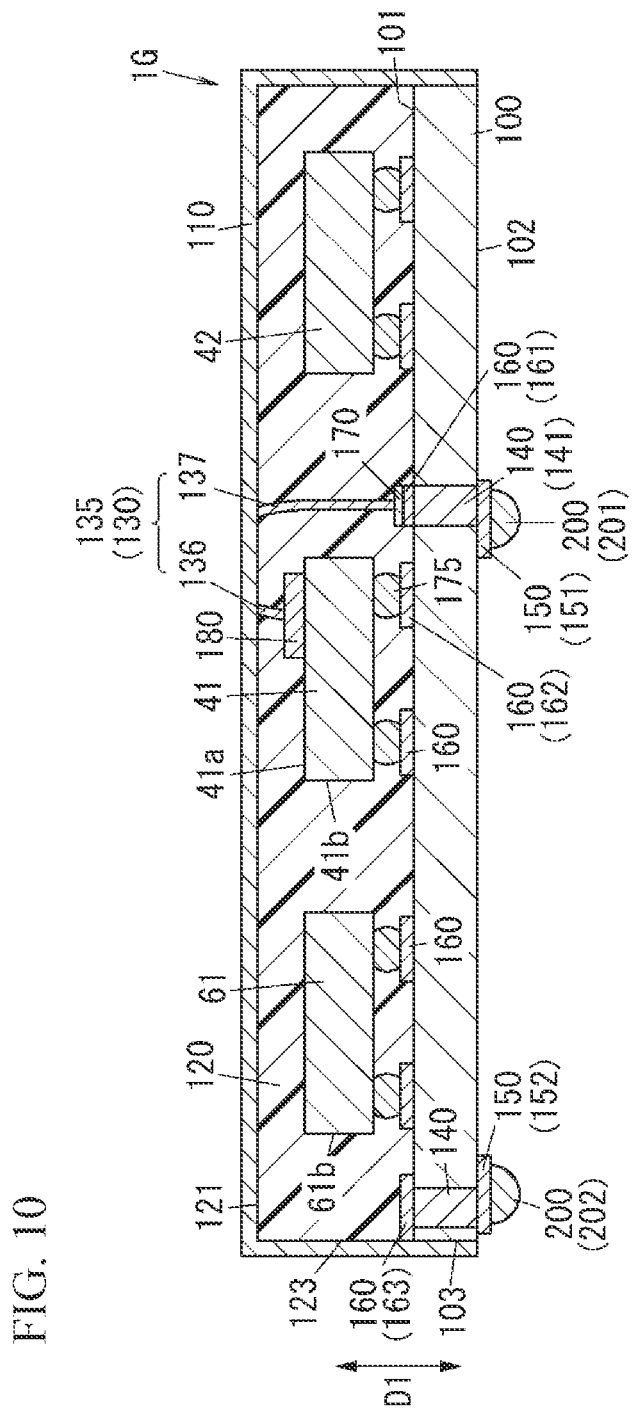
FIG. 10 is a sectional view of a high-frequency module according to Modification 7 of Embodiment 1.

The high-frequency module 1G in Modification 7 includes a plurality of (only one is illustrated in FIG. 10) wires 135 as the metal member 130. Each of the plurality of wires 135 includes a first wire 136 and a second wire 137.

The transmission filter 41 in Modification 7 includes one or more (only one is illustrated in FIG. 10) pads 180 (filter-side pad) on the connection surface 41a. An area of the pad 180 is larger than the area of the second pad 162 (substrate-side pad) of the mounting substrate 100 to which the transmission filter 41 is connected.

The transmission filter 41 is connected to the second pad 162 with the solder bump 175 interposed therebetween. One end of the wire 135, specifically, one end of the first wire 136 is electrically connected to the pad 180. The other end of the first wire 136 is electrically connected to the shielding layer 110. One end of the second wire 137 is electrically connected to the shielding layer 110. The other end of the second wire 137 is electrically connected to the second pad 161 with the solder 170 interposed therebetween. That is, the other end of the second wire 137 is electrically connected to the ground with the solder 170, the second pad 161, and the ground terminal 201 interposed therebetween. Therefore, the transmission filter 41 is electrically connected to the ground with the wire 135 interposed therebetween. More specifically, the transmission filter 41 is electrically connected to the ground with the first wire 136, the shielding layer 110, and the second wire 137 interposed therebetween.

The second wire 137 is disposed between the transmission filter 41 and the reception filter 42 as the electronic component. That is, a portion of the metal member 130c disposed between the transmission filter 41 and the reception filter 42 includes at least the second wire 137.

In this configuration, the transmission filter 41 is connected to the ground with the shielding layer 110 interposed therebetween, and is also connected to the ground with the wire 135 as the metal member 130 interposed therebetween. That is, the high-frequency module 1 can increase the number of paths through which the transmission filter 41 is connected to the ground.

Note that the plurality of first wires 136 included in the respective wires 135 may electrically be connected to the plurality of pads 180 to be one to one correspondence. Alternatively, two or more first wires may electrically be connected to one pad 180.

Also in Modification 7, a heat dissipation property of the electronic component such as the filter can further be improved.

(4.8) Modification 8

Although, in Embodiment 1, the third member 133 of the metal member 130 projects in the same direction as the projecting direction of the first member 131 with respect to the second member 132 when seen in plan view in the thickness direction D1 of the mounting substrate 100, the configuration is not limited to this.

The third member 133 may project in the opposite direction from the projecting direction of the first member 131 with respect to the second member 132 when seen in plan view in the thickness direction D1 of the mounting substrate 100.

Also in Modification 8, a heat dissipation property of the electronic component such as the filter can further be improved.

(4.9) Modification 9

Although, in Embodiment 1, the application target object of the metal member 130 is the transmission filter 41, the configuration is not limited to this.

The application target object of the metal member 130 may be the reception filter 42.

Also in Modification 9, a heat dissipation property of the electronic component such as the filter can further be improved.

Embodiment 2

A high-frequency module 1H according to Embodiment 2 is different from the high-frequency module 1 according to Embodiment 1 in that it further includes a second metal member 300 different from the first metal member 130 as the metal member 130. The high-frequency module 1H according to Embodiment 2 is described below focusing on different points. Note that, regarding the high-frequency module 1H according to Embodiment 2, the same reference characters are given to components similar to the high-frequency module 1 according to Embodiment 1, and description thereof is omitted as appropriate.

(1) Configuration

The high-frequency module 1H includes the second metal member 300 (see FIG. 11) in addition to the configuration of the high-frequency module 1 according to Embodiment 1.

The second metal member 300 is disposed at the first principal surface 101 of the mounting substrate 100. Specifically, the second metal member 300 is electrically connected at one end to the power amplifier 61, and is electrically connected at the other end to the first principal surface 101 of the mounting substrate 100. The one end of the second metal member 300 is electrically connected to a connection surface 61a of the power amplifier 61 which is the surface on the opposite side from the mounting substrate 100. A portion of the second metal member 300 is electrically connected to the shielding layer 110.

The second metal member 300 has a portion disposed between the power amplifier 61 and the electronic component disposed at the first principal surface 101 of the mounting substrate 100 when seen in plan view in the thickness direction D1 of the mounting substrate 100. In Embodiment 2, the second metal member 300 has a portion disposed between the power amplifier 61 and the transmission filter 41 when seen in plan view in the thickness direction D1 of the mounting substrate 100.

Figure 11:
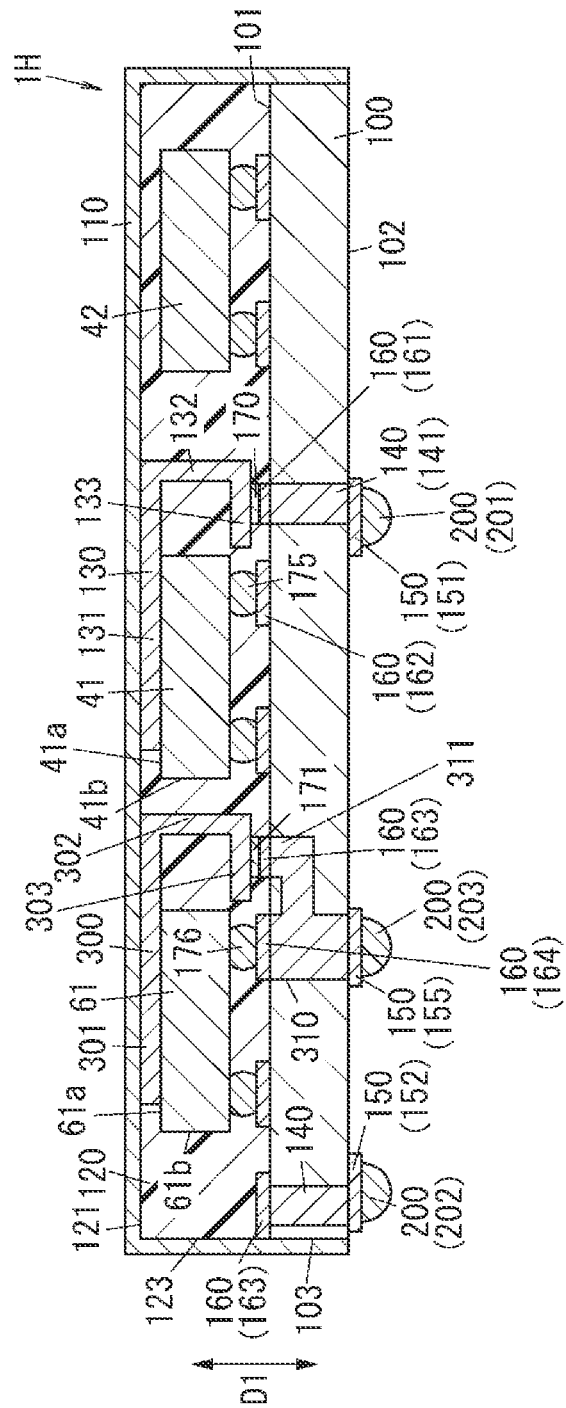
FIG. 11 is a sectional view of a high-frequency module according to Embodiment 2.

The second metal member 300 has conductivity. As illustrated in FIG. 11, the second metal member 300 has, as with the first metal member 130 as the metal member 130, a plate-shaped first member 301, a plate-shaped second member 302, and a plate-shaped third member 303. In Embodiment 2, the thicknesses of the first member 301, the second member 302, and the third member 303 are the same.

The first member 301 is disposed between the power amplifier 61 and the shielding layer 110 in the thickness direction D1 of the mounting substrate 100. The first member 301 is directly connected to a pad (not illustrated) provided to the connection surface 61a. Further, the first member 301 is electrically connected to the shielding layer 110. More specifically, among two surfaces of the first member 301 opposed to each other in the thickness direction D1 of the mounting substrate 100, the surface closer to the mounting substrate 100 is electrically connected to the pad provided to the connection surface 61a of the power amplifier 61. Among the two surfaces of the first member 301 opposed to each other in the thickness direction D1 of the mounting substrate 100, the surface on the opposite side from the mounting substrate 100 is electrically connected to the shielding layer 110.

The second member 302 intersects with the first member 301, and is coupled to the first member 301. The second member 302 is provided along the thickness direction D1 of the mounting substrate 100 (see FIG. 11). That is, the first member 301 projects in the direction intersecting with the thickness direction D1 of the mounting substrate 100. The second member 302 is disposed between the power amplifier 61 and the transmission filter 41 when seen in plan view in the thickness direction D1 of the mounting substrate 100. That is, a portion of the second metal member 300 disposed between the power amplifier 61 and the transmission filter 41 includes at least a portion of the second member 302.

The third member 303 projects from an end portion of the second member 302. Specifically, the third member 303 projects from, among both end portions of the second member 302 in the thickness direction D1 of the mounting substrate 100, an end portion different from an end portion coupled to the first member 301. When seen in plan view in the thickness direction D1 of the mounting substrate 100, the third member 303 projects in the same direction as the projecting direction of the first member 301 with respect to the second member 302. The third member 303 is electrically connected to the first principal surface 101 of the mounting substrate 100 with a solder 171 interposed therebetween. Specifically, the third member 303 is electrically connected to a second pad 163 of the plurality of second pads 160 provided to the first principal surface 101 of the mounting substrate 100, with the solder 171 interposed therebetween.

The power amplifier 61 is electrically connected to a second pad 164 of the plurality of second pads 160 with a solder bump 176 interposed therebetween. The second pad 164 is electrically connected to a heat dissipation via conductor 310. The heat dissipation via conductor 310 is electrically connected to a first pad 155 of the plurality of first pads 150. The first pad 155 is electrically connected to a ground terminal 203 which is one of the plurality of external connection terminals 200.

The second pad 163 is electrically connected to the heat dissipation via conductor 310 through a path 311 including at least one via conductor of the plurality of via conductors 140 and at least one conductive layer of the plurality of conductive layers. That is, the third member 133 is electrically connected to the heat dissipation via conductor 310.

Here, as described above, the mounting substrate 100 according to Embodiment 2 includes the plurality of pads (here, the second pads 160) disposed at the first principal surface 101 of the mounting substrate 100. The power amplifier 61 is electrically connected to the second pad 163 with the solder 171 interposed therebetween. An area of the first member 301 is larger than an area of the second pad 163.

The second metal member 300 is electrically connected to the ground terminal 203 which is the external connection terminal 200 connected to the ground among the plurality of external connection terminals 200, with the heat dissipation via conductor 310 interposed therebetween. More specifically, the third member 303 of the second metal member 300 is electrically connected to the ground terminal 203 which is electrically connected to the first pad 155.

In this configuration, the power amplifier 61 is connected to the ground with the shielding layer 110 interposed therebetween, and is also connected to the ground with the second metal member 300 interposed therebetween. That is, the high-frequency module 1H can increase the number of paths through which the power amplifier 61 is connected to the ground.

(2) Effects

As described above, the high-frequency module 1H in Embodiment 2 includes the mounting substrate 100, the power amplifier 61, the resin layer 120, the shielding layer 110, and the metal member (for example, the second metal member 300). The mounting substrate 100 has the first principal surface 101 and the second principal surface 102 opposed to each other. The power amplifier 61 is disposed at the first principal surface 101 of the mounting substrate 100, and amplifies a transmission signal which is a high-frequency signal. The resin layer 120 is provided on the first principal surface 101 side of the mounting substrate 100, and covers at least a portion of the outer peripheral surface of the power amplifier 61. The shielding layer 110 is provided to the surface of the resin layer 120 on the opposite side from the mounting substrate 100, covers at least a portion of the resin layer 120, and is connected to the ground. The metal member (second metal member 300) is connected at one end to the power amplifier 61, and is connected at the other end to the first principal surface 101 of the mounting substrate 100. The metal member (second metal member 300) has the plate-shaped first member 301 and the plate-shaped second member 302. The first member 301 is provided between the power amplifier 61 and the shielding layer 110. The second member 302 intersects with the first member 301. The first member 301 is connected to the power amplifier 61 and the shielding layer 110.

In this configuration, the power amplifier 61 is connected to the ground with the shielding layer 110 interposed therebetween, and is also connected to the ground with the second metal member 300 interposed therebetween. That is, the high-frequency module 1H can increase the number of paths through which the power amplifier 61 is connected to the ground. Therefore, a heat dissipation property of the electronic component such as the power amplifier 61 can further be improved.

The high-frequency module 1H further includes the electronic component (for example, the transmission filter 41) disposed at the first principal surface 101 of the mounting substrate 100. When seen in plan view in the thickness direction D1 of the mounting substrate 100, the metal member (second metal member 300) has the portion (for example, the second member 302) disposed between the power amplifier 61 and the electronic component.

In this configuration, the isolation between the power amplifier 61 and the electronic component during communication can be improved.

(3) Modifications

Modifications of Embodiment 2 are described below.

(3.1) Modification 1

A high-frequency module 1J according to Modification 1 of Embodiment 2 is described with reference to FIG. 12. Regarding the high-frequency module 1J according to Modification 1, the same reference characters are given to components similar to the high-frequency module 1H according to Embodiment 2, and description thereof is omitted as appropriate.

The high-frequency module 1J according to Modification 1 is provided with a first metal member 130j instead of the first metal member 130 provided to the high-frequency module 1H according to Embodiment 2.

When the mounting substrate 100 is seen in plan view, the first metal member 130j has a portion disposed between the filter and the electronic component disposed at the first principal surface 101 of the mounting substrate 100. In Modification 1 of Embodiment 2, the first metal member 130j has a portion disposed between the transmission filter 41 and the reception filter 42 when seen in plan view in the thickness direction D1 of the mounting substrate 100.

The first metal member 130j has conductivity. As illustrated in FIG. 12, the first metal member 130j has a plate-shaped partition member 132j and a plate-shaped connection member 133j. In Modification 1, the thicknesses of the partition member 132j and the connection member 133j are the same.

Figure 12:
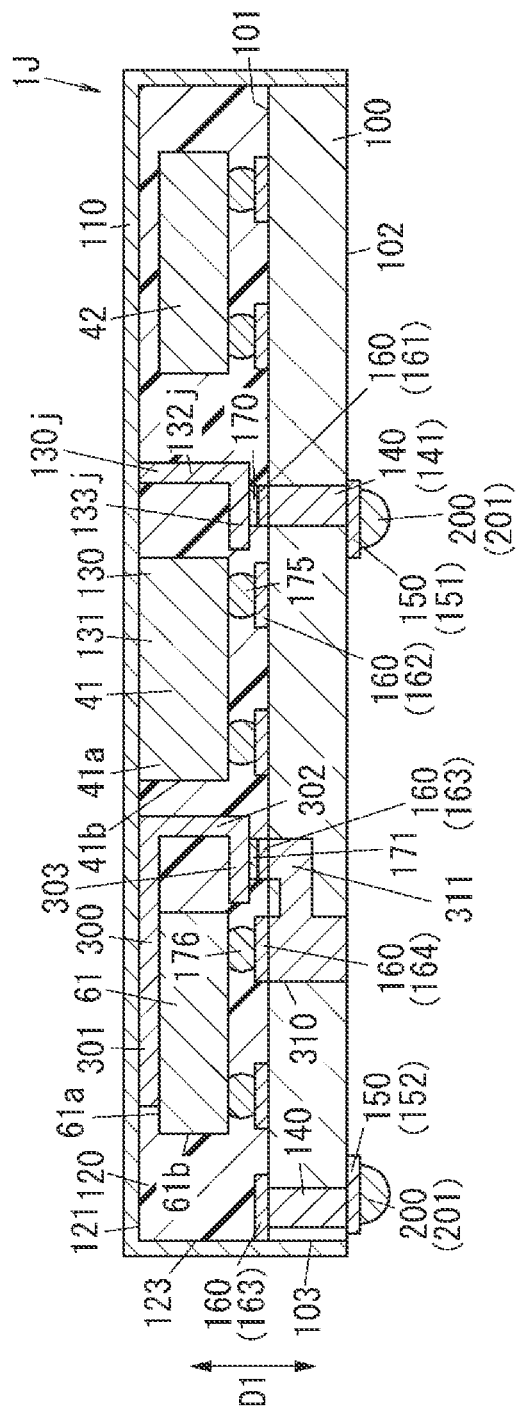
FIG. 12 is a sectional view of a high-frequency module according to Modification 1 of Embodiment 2.

The partition member 132j is provided along the thickness direction D1 (see FIG. 12). The partition member 132j is disposed between the transmission filter 41 and the reception filter 42. That is, a portion of the first metal member 130j disposed between the transmission filter 41 and the reception filter 42 includes at least the partition member 132j. Among both ends of the partition member 132j in the thickness direction D1 of the mounting substrate 100, one end is electrically connected to the shielding layer 110. Among both ends of the partition member 132j in the thickness direction D1 of the mounting substrate 100, the other end is coupled to the connection member 133j.

The connection member 133j is coupled to the end portion of the partition member 132j, and projects from the end portion. Specifically, the third member 133 projects from, among both end portions of the second member 132 in the thickness direction D1 of the mounting substrate 100, the end portion different from the end portion electrically connected to the shielding layer 110. When seen in plan view in the thickness direction D1 of the mounting substrate 100, the connection member 133j projects with respect to the second member 132. The connection member 133j is electrically connected to the first principal surface 101 of the mounting substrate 100 with the solder 170 interposed therebetween. Specifically, the connection member 133j is electrically connected to the second pad 161 with the solder 170 interposed therebetween. Here, the second pad 161 is electrically connected to the first pad 151 with the via conductor 141 interposed therebetween. That is, the connection member 133j is electrically connected to the first pad 151.

The connection surface 41a of the transmission filter 41 is electrically connected to the shielding layer 110 without intervention of the first metal member 130 (see FIG. 12).

Also in Modification 1, a heat dissipation property of the electronic component such as the power amplifier 61 can further be improved.

Moreover, the first metal member 130 in Modification 1 is applicable to Embodiment 1 and the modifications of Embodiment 1.

(3.2) Modification 2

Modification 1 of Embodiment 1 may be applied to the second metal member 300 in Embodiment 2. That is, the first member 301 of the second metal member 300 may electrically be connected to the power amplifier 61 with another member having conductivity interposed therebetween.

For example, the first member 301 according to Modification 2 may electrically be connected to the power amplifier 61 with a solder interposed therebetween.

Also in Modification 2, a heat dissipation property of the electronic component such as the power amplifier 61 can further be improved.

(3.3) Modification 3

Modification 2 of Embodiment 1 may be applied to the second metal member 300 in Embodiment 2. That is, the thickness of the first member 301 of the second metal member 300 may be thinner than each of the thicknesses of the second member 302 and the third member 303.

Also in Modification 3, a heat dissipation property of the electronic component such as the power amplifier 61 can further be improved.

(3.4) Modification 4

Modification 3 of Embodiment 1 may be applied to the second metal member 300 in Embodiment 2. That is, the second metal member 300 does not necessarily include the third member 303.

In this case, among both end portions of the second member 302 of the second metal member 300 in the thickness direction D1 of the mounting substrate 100, the end portion, which is different from the end portion coupled to the first member 301, of the second member 302 is electrically connected to the first principal surface 101 of the mounting substrate 100 with the solder 170 interposed therebetween. Specifically, the second member 302 is electrically connected to the second pad 161 provided to the first principal surface 101 of the mounting substrate 100 with the solder 170 interposed therebetween.

Also in Modification 4, a heat dissipation property of the electronic component such as the power amplifier 61 can further be improved.

(3.5) Modification 5

Modification 4 of Embodiment 1 may be applied to the second metal member 300 in Embodiment 2. That is, the first member 301 of the second metal member 300 may be formed to have a spring shape.

In this case, a portion where the spring-shaped first member 301 and the plate-shaped second member 302 couple to each other is electrically connected to the shielding layer 110. By the first member 301 having the spring shape, various power amplifiers 61 with different thicknesses can be connected to the second metal member 300.

Also in Modification 5, a heat dissipation property of the electronic component such as the power amplifier 61 can further be improved.

(3.6) Modification 6

Modification 5 or 6 of Embodiment 1 may be applied to the high-frequency module 1H in Embodiment 2. That is, in the mounting substrate 100 of the high-frequency module 1H, the electronic component (for example, the switch 20) may be mounted on (disposed at) the second principal surface 102 of the mounting substrate 100.

Also in Modification 6, a heat dissipation property of the electronic component such as the power amplifier 61 can further be improved.

(3.7) Modification 7

Modification 8 of Embodiment 1 may be applied to the second metal member 300 in Embodiment 2. That is, the third member 303 may project in the opposite direction from the projecting direction of the first member 301 with respect to the second member 302 when seen in plan view in the thickness direction D1 of the mounting substrate 100.

Also in Modification 7, a heat dissipation property of the electronic component such as the power amplifier 61 can further be improved.

(3.8) Modification 8

In Embodiment 2, the first metal member 130 is an optional component. That is, in Embodiment 2, the high-frequency module 1G includes at least the second metal member 300 among the first metal member 130 and the second metal member 300.

Also in Modification 8, a heat dissipation property of the electronic component such as the power amplifier 61 can further be improved.

(3.9) Modification 9

Modifications 1 to 4 and 7 to 9 of Embodiment 1 may be applied to the first metal member 130 in Embodiment 2.

Also in Modification 9, a heat dissipation property of the electronic component such as the power amplifier 61 can further be improved.

Embodiment 3

A high-frequency module 1K according to Embodiment 3 is different from the high-frequency module 1 according to Embodiment 1 in terms of the connection between the metal member and the shielding layer 110. The high-frequency module 1K according to Embodiment 3 is described below focusing on different points. Note that, regarding the high-frequency module 1K according to Embodiment 3, the same reference characters are given to components similar to the high-frequency module 1 according to Embodiment 1, and description thereof is omitted as appropriate.

(1) Configuration

The high-frequency module 1K includes a metal member 130k instead of the metal member 130 in the configuration of the high-frequency module 1 according to Embodiment 1.

In the high-frequency module 1K according to Embodiment 3, the shielding layer 110 covers at least a portion of the side surface (outer peripheral surface 123) of the resin layer 120. In Embodiment 3, the shielding layer 110 covers the principal surface 121 of the resin layer 120 on the opposite side from the mounting substrate 100 side, the outer peripheral surface (side surface) 123 of the resin layer 120, and the outer peripheral surface (side surface) 103 of the mounting substrate 100.

The metal member 130k is disposed at the first principal surface 101 of the mounting substrate 100. The metal member 130k is connected to the surface of the filter (transmission filter 41) on the opposite side from the mounting substrate 100, the shielding layer 110, and the first principal surface 101 of the mounting substrate 100.

The metal member 130k has a portion disposed between the filter and the electronic component disposed at the first principal surface 101 of the mounting substrate 100 when seen in plan view in the thickness direction D1 of the mounting substrate 100. In Embodiment 3, the metal member 130k has a portion disposed between the transmission filter 41 and the power amplifier 61 disposed at the first principal surface 101 of the mounting substrate 100 when seen in plan view in the thickness direction D1 of the mounting substrate 100.

The metal member 130k has conductivity. The metal member 130k has a plate-shaped first member 131k, a plate-shaped second member 132k, and a plate-shaped third member 133k. In Embodiment 3, the thicknesses of the first member 131k, the second member 132k, and the third member 133k are the same.

The first member 131k is provided between the transmission filter 41 which is the filter and the shielding layer 110 in the thickness direction D1 of the mounting substrate 100. The first member 131k is directly connected to the pad (not illustrated) provided to the connection surface 41a of the transmission filter 41. Further, the first member 131k is electrically connected to the shielding layer 110. Specifically, among two surfaces 1321 and 1322 of the first member 131k opposed to each other in the thickness direction D1 of the mounting substrate 100, the surface 1322 closer to the mounting substrate 100 is electrically connected to the pad provided to the connection surface 41a of the transmission filter 41. Moreover, among the two surfaces 1321 and 1322 of the first member 131k, the surface 1321 is covered by the resin layer 120. That is, the resin layer 120 of the high-frequency module 1K according to Embodiment 3 covers the surface 1321 of the first member 131k.

Figure 13:
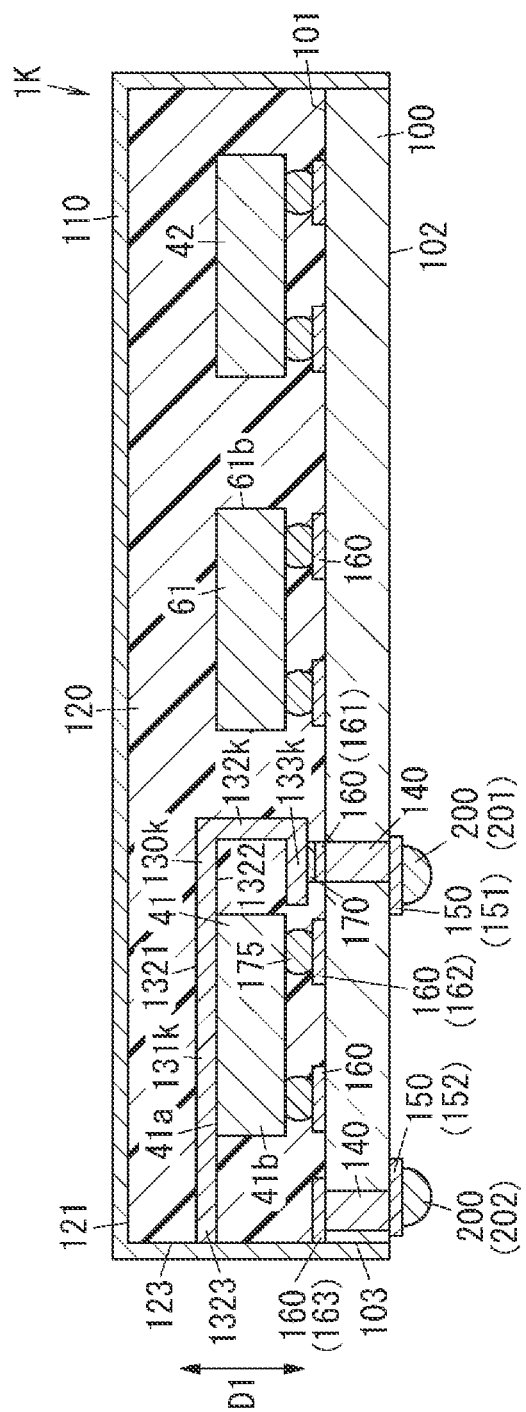
FIG. 13 is a sectional view of a high-frequency module according to Embodiment 3.

The shielding layer 110 disposed at the side surface of the resin layer 120 and at least one end portion 1323 of the plate-shaped first member 131k are electrically connected to each other (see FIG. 13).

The second member 132k intersects with the first member 131k, and is coupled to the first member 131k. The second member 132k is provided along the thickness direction D1 of the mounting substrate 100 (see FIG. 13). That is, the first member 131k projects from an end portion (an upper end in FIG. 13) of the second member 132k in the direction intersecting with the thickness direction D1 of the mounting substrate 100. The second member 132k is disposed between the transmission filter 41 and the power amplifier 61 as the electronic component. That is, a portion of the metal member 130k disposed between the transmission filter 41 and the power amplifier 61 includes at least a portion of the second member 132k.

The third member 133k projects from an end portion of the second member 132k. Specifically, the third member 133k projects in the direction intersecting with the thickness direction D1 of the mounting substrate 100, from an end portion (a lower end in FIG. 13) different from the end portion (the upper end in FIG. 13) coupled to the first member 131k among both end portions of the second member 132k in the thickness direction D1 of the mounting substrate 100. When seen in plan view in the thickness direction D1 of the mounting substrate 100, the third member 133k projects in the same direction as the projecting direction of the first member 131k with respect to the second member 132k. The third member 133k is electrically connected to the first principal surface 101 of the mounting substrate 100 with the solder 170 interposed therebetween. Specifically, the third member 133k is electrically connected to the second pad 161 of the plurality of second pads 160 provided to the first principal surface 101 of the mounting substrate 100, with the solder 170 interposed therebetween. Here, the second pad 161 is electrically connected to the first pad 151 of the plurality of first pads 150, with the via conductor 141 of the plurality of via conductors 140 interposed therebetween. That is, the third member 133k is electrically connected to the first pad 151.

(2) Effects

As described above, the high-frequency module 1K in Embodiment 3 includes the mounting substrate 100, the power amplifier 61, the resin layer 120, the shielding layer 110, and the metal member 130k. The mounting substrate 100 has the first principal surface 101 and the second principal surface 102 opposed to each other. The power amplifier 61 is disposed at the first principal surface 101 of the mounting substrate 100, and amplifies a transmission signal which is a high-frequency signal. The resin layer 120 is provided on the first principal surface 101 side of the mounting substrate 100, and covers at least a portion of the outer peripheral surface of the power amplifier 61. The shielding layer 110 is provided to the surface of the resin layer 120 on the opposite side from the mounting substrate 100, covers at least a portion of the resin layer 120, and is connected to the ground. The metal member 130k is disposed at the first principal surface 101 of the mounting substrate 100. The metal member 130k is connected to the surface of the filter (transmission filter 41) on the opposite side from the mounting substrate 100, the shielding layer 110, and the first principal surface 101 of the mounting substrate 100.

The shielding layer 110 covers at least a portion of the side surface (outer peripheral surface 123) of the resin layer 120. The shielding layer 110 disposed at the side surface of the resin layer 120 is electrically connected to at least one end portion 1323 of the plate-shaped first member 131k.

In this configuration, the filter is connected to the ground with the shielding layer 110 interposed therebetween, and is also connected to the ground with the metal member 130k interposed therebetween. That is, in the high-frequency module 1K, the number of heat dissipation paths increases. Therefore, a heat dissipation property of the electronic component such as the filter can further be improved.

Moreover, since both of the shielding layer 110 and the metal member 130k are connected to the ground, in both of the path from the shielding layer 110 to the ground and the path from the metal member 130k to the ground, the heat dissipation characteristics can be improved.

The high-frequency module 1K further includes the electronic component (for example, the power amplifier 61) disposed at the first principal surface 101 of the mounting substrate 100. When seen in plan view in the thickness direction D1 of the mounting substrate 100, the metal member 130k has the portion (for example, the second member 132k) disposed between the filter and the electronic component (power amplifier 61).

In this configuration, the isolation between the filter and the electronic component during communication can be improved.

(3) Modifications

Modifications of Embodiment 3 are described below.

(3.1) Modification 1

A high-frequency module 1M according to Modification 1 of Embodiment 3 is described with reference to FIG. 14. Regarding the high-frequency module 1M according to Modification 1, the same reference characters are given to components similar to the high-frequency module 1K according to Embodiment 3, and description thereof is omitted as appropriate.

The high-frequency module 1M according to Modification 1 of Embodiment 3 includes a metal member 130m instead of the metal member 130k in the configuration of the high-frequency module 1K according to Embodiment 3.

In the high-frequency module 1K according to Embodiment 3, the shielding layer 110 covers at least a portion of the side surface (outer peripheral surface 123) of the resin layer 120. In Modification 1 of Embodiment 3, the shielding layer 110 covers the principal surface 121 of the resin layer 120 on the opposite side from the mounting substrate 100 side, the outer peripheral surface (side surface) 123 of the resin layer 120, and the outer peripheral surface (side surface) 103 of the mounting substrate 100.

The metal member 130m is disposed at the first principal surface 101 of the mounting substrate 100. The metal member 130m is connected to the surface of the filter (transmission filter 41) on the opposite side from the mounting substrate 100, the shielding layer 110, and the first principal surface 101 of the mounting substrate 100.

The metal member 130m has a portion disposed between the filter and the electronic component disposed at the first principal surface 101 of the mounting substrate 100 when seen in plan view in the thickness direction D1 of the mounting substrate 100. In Modification 1 of Embodiment 3, the metal member 130m has a portion disposed between the transmission filter 41 and the power amplifier 61 disposed at the first principal surface 101 of the mounting substrate 100 when seen in plan view in the thickness direction D1 of the mounting substrate 100.

The metal member 130m has conductivity. The metal member 130m has a plate-shaped first member 131m, a plate-shaped second member 132m, a plate-shaped third member 133m, and a plate-shaped fourth member 134m. The second member 132m and the fourth member 134m are opposed to each other in the direction intersecting with the thickness direction D1 and in an aligned direction of the transmission filter 41 and the power amplifier 61. In Embodiment 3, the thicknesses of the first member 131m, the pair of second members 132m, and the third member 133m are the same.

The first member 131m is provided between the transmission filter 41 which is the filter and the shielding layer 110 in the thickness direction D1 of the mounting substrate 100. The first member 131m is directly connected to the pad (not illustrated) provided to the connection surface 41a of the transmission filter 41. Further, the first member 131m is electrically connected to the shielding layer 110. Specifically, among two surfaces 1331 and 1332 of the first member 131m opposed to each other in the thickness direction D1 of the mounting substrate 100, the surface 1332 closer to the mounting substrate 100 is electrically connected to the pad provided to the connection surface 41a of the transmission filter 41. Moreover, among the two surfaces 1331 and 1332 of the first member 131m, the surface 1331 is covered by the resin layer 120. That is, the resin layer 120 of the high-frequency module 1M according to Embodiment 3 covers the surface 1321 of the first member 131m.

The second member 132m and the fourth member 134m intersect with the first member 131m, and are coupled to the first member 131m. The second member 132m and the fourth member 134m are provided to both ends of the first member 131m along the thickness direction D1 of the mounting substrate 100 (see FIG. 14). That is, the second member 132m and the fourth member 134m project toward the mounting substrate 100 from both ends of the first member 131m along the thickness direction D1 of the mounting substrate 100.

Figure 14:
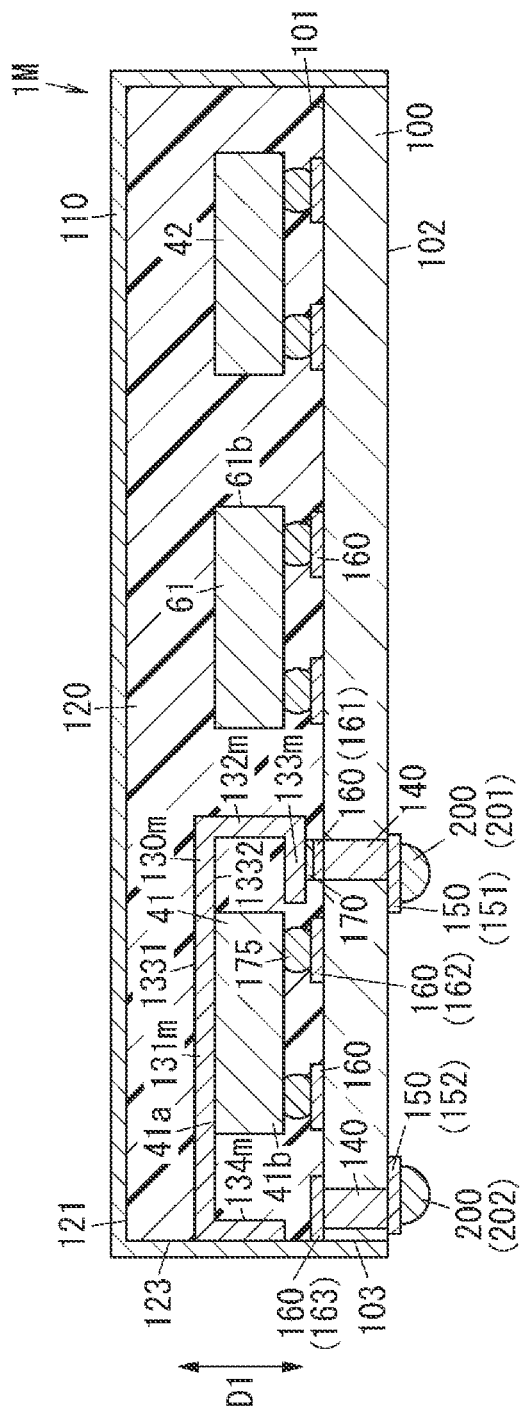
FIG. 14 is a sectional view of a high-frequency module according to Modification 1 of Embodiment 3.

The shielding layer 110 disposed at the side surface of the resin layer 120 and the plate-shaped fourth member 134m are electrically connected to each other (see FIG. 14).

Moreover, the second member 132m is disposed between the transmission filter 41 and the power amplifier 61 as the electronic component. That is, a portion of the metal member 130m disposed between the transmission filter 41 and the power amplifier 61 includes at least a portion of the second member 132m.

The third member 133k projects from an end portion of the second member 132m. Specifically, the third member 133m projects in the direction intersecting with the thickness direction D1 of the mounting substrate 100, from an end portion (a lower end in FIG. 14) different from an end portion (an upper end in FIG. 14) coupled to the first member 131m among both end portions of the second member 132m in the thickness direction D1 of the mounting substrate 100. When seen in plan view in the thickness direction D1 of the mounting substrate 100, the third member 133m projects in the same direction as the projecting direction of the first member 131m with respect to the second member 132m. The third member 133m is electrically connected to the first principal surface 101 of the mounting substrate 100 with the solder 170 interposed therebetween. Specifically, the third member 133m is electrically connected to the second pad 161 of the plurality of second pads 160 provided to the first principal surface 101 of the mounting substrate 100, with the solder 170 interposed therebetween. Here, the second pad 161 is electrically connected to the first pad 151 of the plurality of first pads 150, with the via conductor 141 of the plurality of via conductors 140 interposed therebetween. That is, the third member 133k is electrically connected to the first pad 151.

Moreover, the metal member 130m in Modification 1 is applicable to Embodiment 1 and Modifications 1 to 3, 5 to 6, and 8 of Embodiment 1. The metal member 130m in Modification 1 is applicable to Embodiment 2 and the modifications of Embodiment 2.

(3.2) Modification 2

Modification 1 of Embodiment 1 may be applied to the metal member 130k in Embodiment 3. That is, the first member 131k of the metal member 130k may electrically be connected to the transmission filter 41 with another member having conductivity interposed therebetween.

For example, the first member 131k according to Modification 2 may electrically be connected to the transmission filter 41 with a solder interposed therebetween.

Also in Modification 2, a heat dissipation property of the electronic component such as the transmission filter 41 can further be improved.

(3.3) Modification 3

Modification 2 of Embodiment 1 may be applied to the metal member 130k in Embodiment 3. That is, the thickness of the first member 131k of the metal member 130k may be thinner than each of the thicknesses of the second member 132k and the third member 133k.

Also in Modification 3, a heat dissipation property of the electronic component such as the transmission filter 41 can further be improved.

(3.4) Modification 4

Modification 3 of Embodiment 1 may be applied to the metal member 130k in Embodiment 3. That is, the metal member 130k does not necessarily include the third member 133k.

In this case, among both end portions of the second member 132k of the metal member 130k in the thickness direction D1 of the mounting substrate 100, the end portion, which is different from the end portion coupled to the first member 131k, of the second member 132k is electrically connected to the first principal surface 101 of the mounting substrate 100 with the solder 170 interposed therebetween. Specifically, the second member 132k is electrically connected to the second pad 161 provided to the first principal surface 101 of the mounting substrate 100 with the solder 170 interposed therebetween.

Also in Modification 4, a heat dissipation property of the electronic component such as the transmission filter 41 can further be improved.

(3.5) Modification 5

Modification 5 or 6 of Embodiment 1 may be applied to the high-frequency module 1K in Embodiment 3. That is, in the mounting substrate 100 of the high-frequency module 1K, the electronic component (for example, the switch 20) may be mounted on (disposed at) the second principal surface 102 of the mounting substrate 100.

Also in Modification 5, a heat dissipation property of the electronic component such as the transmission filter 41 can further be improved.

(3.6) Modification 6

Modification 8 of Embodiment 1 may be applied to the metal member 130k in Embodiment 3. That is, the third member 133k may project in the opposite direction from the projecting direction of the first member 131k with respect to the second member 132k when seen in plan view in the thickness direction D1 of the mounting substrate 100.

Also in Modification 6, a heat dissipation property of the electronic component such as the transmission filter 41 can further be improved.

(3.7) Modification 7

The metal member 130k in Embodiment 3 may be applied to the high-frequency module 1H according to Embodiment 2 as a substitute for the second metal member 300. In the case where the metal member 130k in Embodiment 3 is applied to the high-frequency module 1H according to Embodiment 2 as a substitute for the second metal member 300, the modifications of Embodiment 2 may be combined as appropriate.

Summary

As described above, the high-frequency module (1; 1A to 1H; 1J; 1K; 1M) of the first aspect includes the mounting substrate (100), the filter (for example, the transmission filter 41), the resin layer (120), the shielding layer (110), and the metal member (130; 130b; 130c; 130d; 135; 130k; 130m). The mounting substrate (100) has the first principal surface (101) and the second principal surface (102) opposed to each other. The filter is disposed at the first principal surface (101) of the mounting substrate (100) and allows a high-frequency signal to pass therethrough. The resin layer (120) is provided on the first principal surface (101) side of the mounting substrate (100), and covers at least a portion of the outer peripheral surface (for example, the outer peripheral surface 41b) of the filter. The shielding layer (110; 110e) is provided to the surface of the resin layer (120) on the opposite side from the mounting substrate (100), covers at least a portion of the resin layer (120), and is connected to the ground. The metal member (130; 130b; 130c; 130d; 135) is disposed at the first principal surface (101) of the mounting substrate (100). The metal member (130; 130b; 130c; 130d; 135; 130k; 130m) is connected to the surface of the filter on the opposite side from the mounting substrate (100), the shielding layer (110; 110e), and the first principal surface (101) of the mounting substrate (100).

In this configuration, a heat dissipation property of the electronic component such as the filter can further be improved.

The high-frequency module (1; 1A to 1H; 1J; 1K; 1M) of the second aspect further includes, in the first aspect, the electronic component disposed at the first principal surface (101) of the mounting substrate (100). The metal member (130; 130b; 130c; 130d; 135; 130k; 130m) has the portion (for example, the second member 132) disposed between the filter and the electronic component when seen in plan view in the thickness direction (D1) of the mounting substrate (100).

In this configuration, the isolation between the filter and the electronic component during communication can be improved.

In the high-frequency module (1; 1A to 1H; 1J; 1K; 1M) of the third aspect, in the second aspect, the metal member (130; 130b; 130c; 130d; 130k; 130m) has the plate-shaped first member (131; 131b; 131c; 131d; 131k; 131m) and the plate-shaped second member (132; 132b; 132c; 132d; 132k; 132m). The first member (131; 131b; 131c; 131d; 131k; 131m) is provided between the filter and the shielding layer (110; 110e) in the thickness direction (D1) of the mounting substrate (100). The second member (132; 132b; 132c; 132d; 132k; 132m) intersects with the first member (131; 131b; 131c; 131d; 131k; 131m). The first member (131;

131*b*; 131*c*; 131*d*; 131*k*; 131*m*) is connected to the filter and the shielding layer (100; 100*e*). The portion disposed between the filter and the electronic component in plan view in the thickness direction (D1) of the mounting substrate (100) includes at least a portion of the second member (132; 132*b*; 132*c*; 132*d*; 132*k*; 132*m*).

In this configuration, the isolation between the filter and the electronic component during communication can be improved while further improving a heat dissipation property of the electronic component such as the filter.

In the high-frequency module (1C) of the fourth aspect, in the third aspect, an end portion of the second member (132*c*) is connected to the first principal surface (101) with the solder (170) interposed therebetween.

In this configuration, a mounting area on the first principal surface (101) of the mounting substrate (100) can be secured.

In the high-frequency module (1; 1A; 1B; 1D to 1H; 1J; 1K; 1M) of the fifth aspect, in the third aspect, the metal member (130; 130*b*; 130*d*; 130*k*; 130*m*) further has the plate-shaped third member (133; 133*b*; 133*d*; 133*k*; 133*m*) projecting from the end portion of the second member (132; 132*b*; 132*d*; 132*k*; 132*m*). The third member (133; 133*b*; 133*d*; 133*k*; 133*m*) is connected to the first principal surface (101) with the solder (170) interposed therebetween.

In this configuration, the metal substrate (130; 130*b*; 130*d*; 130*k*; 130*m*) can certainly be connected (fixed) to the mounting substrate (100).

In the high-frequency module (1; 1A; 1B; 1D to 1H; 1J; 1K; 1M) of the sixth aspect, in the fifth aspect, the third member (133; 133*b*; 133*d*; 133*k*; 133*m*) projects from the second member (132; 132*b*; 132*d*) in the same direction as the projecting direction of the first member (131; 131*b*; 131*d*; 131*k*; 131*m*) from the second member (132; 132*b*; 132*d*; 132*k*; 132*m*) when seen in plan view in the thickness direction (D1) of the mounting substrate (100).

In this configuration, the metal substrate (130; 130*b*; 130*d*; 130*k*; 130*m*) can certainly be connected (fixed) to the mounting substrate (100).

In the high-frequency module (1K) of the seventh aspect, in any one of the third to sixth aspects, the shielding layer (110) covers at least a portion of the side surface of the resin layer (120). The shielding layer (110) disposed at the side surface of the resin layer (120) is electrically connected to at least one end portion (1323) of the plate-shaped first member (131*k*).

In this configuration, a heat dissipation property of the electronic component such as the filter can further be improved.

In the high-frequency module (1M) of the eighth aspect, in any one of the third to sixth aspects, the shielding layer (110) covers at least a portion of the side surface of the resin layer (120). The metal member (130*m*) further has a plate-shaped fourth member (134*m*) opposed to the second member (132*m*). The shielding layer (110) disposed at the side surface of the resin layer (120) is electrically connected to the fourth member (134*m*).

In this configuration, a heat dissipation property of the electronic component such as the filter can further be improved.

In the high-frequency module (1; 1A to 1H; 1J) of the ninth aspect, in any one of the third to eighth aspects, the mounting substrate (100) is provided with the pad (for example, the second pad 162) disposed at the first principal surface (101). The filter is connected to the pad with the solder bump (175) interposed therebetween. The area of the first member (131; 131*b*; 131*c*; 131*d*) is larger than the area of the pad when seen in plan view in the thickness direction (D1) of the mounting substrate (100).

In this configuration, the heat dissipation through the metal member (130; 130*b*; 130*c*; 130*d*) can be promoted.

In the high-frequency module (1G) of the tenth aspect, in the first or second aspect, the metal member (130) is the wire (135).

In this configuration, a heat dissipation property of the electronic component such as the filter can further be improved using the wire (135).

In the high-frequency module (1G) of the eleventh aspect, in the tenth aspect, the mounting substrate (100) is provided with the substrate-side pad (for example, the second pad 162) disposed at the first principal surface (101). The filter is provided with, on the surface (for example, the connection surface 41*a*) to which the wire is connected, the filter-side pad (for example, the pad 180) having the area larger than the area of the substrate-side pad. The filter is connected to the substrate-side pad with the solder bump (175) interposed therebetween. One end of the wire (135) is connected to the filter-side pad.

In this configuration, the heat dissipation through the wire (135) can be promoted.

In the high-frequency module (1; 1A to 1H; 1J) of the twelfth aspect, in any one of the second to ninth aspects, the electronic component is the reception filter (42) which allows a reception signal to pass therethrough.

In this configuration, the isolation between the filter and the electronic component during communication can be improved.

In the high-frequency module (1; 1A to 1H; 1J) of the thirteenth aspect, in any one of the first to twelfth aspects, the filter is the transmission filter (41) which allows a transmission signal as the high-frequency signal to pass therethrough.

In this configuration, a heat dissipation property of the electronic component in the transmission system can further be improved.

The high-frequency module (1; 1A to 1H; 1J) of the fourteenth aspect further includes, in any one of the first to thirteenth aspects, the plurality of external connection terminals (200) disposed at the second principal surface (102) of the mounting substrate (100). The metal member (130; 130*b*; 130*c*; 130*d*; 135) is connected to the external connection terminal (for example, the ground terminal 201) connected to the ground, among the plurality of external connection terminals (200).

In this configuration, the heat dissipation to the second principal surface (102) of the mounting substrate (100) can further be promoted.

The high-frequency module (1H; 1J) of the fifteenth aspect includes the mounting substrate (100), the power amplifier (61), the resin layer (120), the shielding layer (110), and the metal member (for example, the second metal member 300). The mounting substrate (100) has the first principal surface (101) and the second principal surface (102) opposed to each other. The power amplifier (61) is disposed at the first principal surface (101) of the mounting substrate (100) and amplifies a transmission signal which is a high-frequency signal. The resin layer (120) is provided on the first principal surface (101) side of the mounting substrate (100), and covers at least a portion of the outer peripheral surface of the power amplifier (61). The shielding layer (110) is provided to the surface of the resin layer (120) on the opposite side from the mounting substrate (100), covers at least a portion of the resin layer (120), and is connected to the ground. The metal member is disposed at the first principal surface (101) of the mounting substrate (100). The metal member (second metal member 300) has the plate-shaped first member (301) and the plate-shaped second member (302). The first member (301) is provided between the power amplifier (61) and the shielding layer (110). The second member (302) intersects with the first member (301). The first member (301) is connected to the power amplifier (61) and the shielding layer (110).

In this configuration, a heat dissipation property of the electronic component such as the power amplifier (61) can further be improved.

The communication device (500) of the sixteenth aspect includes the high-frequency module (1; 1A to 1H; 1J; 1K; 1M) of any one of the first to fifteenth aspects, and the signal processing circuit (501) which processes the high-frequency signal which passes through the high-frequency module (1; 1A to 1H; 1J; 1K; 1M).

In this configuration, a heat dissipation property of the electronic component such as the filter or the power amplifier (61) can further be improved.

The high-frequency module (1H; 1J) of the seventeenth aspect further includes, in the fifteenth aspect, the electronic component disposed at the first principal surface (101) of the mounting substrate (100). The metal member (second metal member 300) has the portion (for example, the second member 302) disposed between the power amplifier (61) and the electronic component when seen in plan view in the thickness direction (D1) of the mounting substrate (100).

In this configuration, the isolation between the filter and the electronic component during communication can be improved.

In the high-frequency module (1H; 1J) of the eighteenth aspect, in the seventeenth aspect, the metal member (second metal member 300) has the plate-shaped first member (301) and the plate-shaped second member (302). The first member (301) is provided between the filter and the shielding layer (110) in the thickness direction (D1) of the mounting substrate (100). The second member (302) intersects with the first member (301). The first member (301) is connected to the power amplifier (61) and the shielding layer (110). The portion disposed between the power amplifier (61) and the electronic component in plan view in the thickness direction (D1) of the mounting substrate (100) includes at least a portion of the second member (302).

In this configuration, the isolation between the filter and the electronic component during communication can be improved while further improving a heat dissipation property of the electronic component such as the power amplifier (61).

In the high-frequency module (1H; 1J) of the nineteenth aspect, in the eighteenth aspect, the other end of the metal member (second metal member 300) is the end portion of the second member (302). The end portion of the second member (302) is connected to the first principal surface (101) with the solder (171) interposed therebetween.

In this configuration, a mounting area on the first principal surface (101) of the mounting substrate (100) can be secured.

In the high-frequency module (1H; 1J) of the twentieth aspect, in the eighteenth aspect, the metal member (second metal member 300) further has the plate-shaped third member (303) projecting from the end portion of the second member (302). The third member (303) is connected to the first principal surface (101) with the solder (171) interposed therebetween.

In this configuration, the metal substrate (second metal member 300) can certainly be connected (fixed) to the mounting substrate (100).

In the high-frequency module (1H; 1J) of the twenty-first aspect, in the twentieth aspect, the third member (303) projects from the second member (302) in the same direction as the projecting direction of the first member (301) from the second member (302) when seen in plan view in the thickness direction (D1) of the mounting substrate (100).

In this configuration, the metal substrate (second metal member 300) can certainly be connected (fixed) to the mounting substrate (100).

In the high-frequency module (1H; 1J) of the twenty-second aspect, in any one of the eighteenth to twenty-first aspects, the mounting substrate (100) is provided with the pad (for example, the second pad 164) disposed at the first principal surface (101). The power amplifier (61) is connected to the pad with the solder bump (176) interposed therebetween. The area of the first member (301) is larger than the area of the pad when seen in plan view in the thickness direction (D1) of the mounting substrate (100).

In this configuration, the heat dissipation through the metal member (second metal member 300) can be promoted.

1, 1A, 1B, 1C, 1D, 1E, 1F, 1G, 1H, 1J, 1K, 1M high-frequency module
10 antenna terminal
20 switch
21 common terminal
22, 23 selection terminal
31 first matching circuit
32 second matching circuit
41 transmission filter
41a connection surface
41b outer peripheral surface
42 reception filter
51 third matching circuit
52 fourth matching circuit
61 power amplifier
61a connection surface
61b outer peripheral surface
62 low noise amplifier
71 signal input terminal
72 signal output terminal
100 mounting substrate
101 first principal surface
102 second principal surface
103 outer peripheral surface
110, 110e shielding layer
120 resin layer (first resin layer)
121 principal surface
123 outer peripheral surface
125 second resin layer
126 outer peripheral surface
130, 130b, 130c, 130d, 130j, 130k, 130m metal member (first metal member)
131, 131b, 131c, 131d, 131k, 131m first member
132, 132b, 132c, 132k, 132m second member
132j partition member
133, 133b, 133k, 133m third member
133j connection member
135 wire
136 first wire
137 second wire
140, 141 via conductor
150, 151, 152, 155 first pad
160, 161, 162, 163, 164 second pad
170, 171 solder 175, 176 solder bump
180 pad
200, 210 external connection terminal
201, 202, 203 ground terminal
250 ball bump
300 second metal member
301 first member
302 second member
303 third member
310 heat dissipation via conductor
311 path
500 communication device
501 signal processing circuit
502 RF signal processing circuit
503 baseband signal processing circuit
510 antenna
1311, 1312, 1321, 1322 surface
1323 end portion
D1 thickness direction

The invention claimed is:

1. A high-frequency module comprising:
a mounting substrate having a first principal surface and a second principal surface opposed to each other;
a filter disposed at the first principal surface of the mounting substrate and configured to allow a high-frequency signal to pass therethrough;
a resin layer provided on a first principal surface side of the mounting substrate, and covering at least a portion of an outer peripheral surface of the filter;
a shielding layer provided to a surface of the resin layer on an opposite side from the mounting substrate, covering at least a portion of the resin layer, and connected to a ground;
a metal member disposed at the first principal surface of the mounting substrate; and
an electronic component disposed at the first principal surface of the mounting substrate,
wherein the metal member is connected to a surface of the filter on the opposite side from the mounting substrate, the shielding layer, and the first principal surface of the mounting substrate, and
wherein the metal member has a portion disposed between the filter and the electronic component when seen in plan view in a thickness direction of the mounting substrate.

2. The high-frequency module according to claim 1, wherein
the metal member has
a plate-shaped first member provided between the filter and the shielding layer in the thickness direction of the mounting substrate, and
a plate-shaped second member intersecting with the first member,
the first member is connected to the filter and the shielding layer, and
the portion disposed between the filter and the electronic component in plan view in the thickness direction of the mounting substrate includes at least a portion of the second member.

3. The high-frequency module according to claim 2, wherein
an end portion of the second member is connected to the first principal surface with a solder interposed therebetween.

4. The high-frequency module according to claim 2, wherein
the metal member further has a plate-shaped third member projecting from an end portion of the second member, and
the third member is connected to the first principal surface with a solder interposed therebetween.

5. The high-frequency module according to claim 4, wherein
the third member projects from the second member in a same direction as a projecting direction of the first member from the second member when seen in plan view in the thickness direction of the mounting substrate.

6. The high-frequency module according to claim 2, wherein
the shielding layer covers at least a portion of a side surface of the resin layer, and
the shielding layer disposed at the side surface of the resin layer is electrically connected to at least one end portion of the plate-shaped first member.

7. The high-frequency module according to claim 2, wherein
the shielding layer covers at least a portion of a side surface of the resin layer,
the metal member further has a plate-shaped fourth member opposed to the second member, and
the shielding layer disposed at the side surface of the resin layer is electrically connected to the fourth member.

8. The high-frequency module according to claim 2, wherein
the mounting substrate is provided with a pad disposed at the first principal surface,
the filter is connected to the pad with a solder bump interposed therebetween, and
an area of the first member is larger than an area of the pad when seen in plan view in the thickness direction of the mounting substrate.

9. The high-frequency module according to claim 1, wherein
the metal member is a wire.

10. The high-frequency module according to claim 9, wherein
the mounting substrate is provided with a substrate-side pad disposed at the first principal surface,
the filter is provided with, on a surface to which the wire is connected, a filter-side pad having an area larger than an area of the substrate-side pad,
the filter is connected to the substrate-side pad with a solder bump interposed therebetween, and
one end of the wire is connected to the filter-side pad.

11. The high-frequency module according to claim 1, wherein
the electronic component is a reception filter configured to allow a reception signal to pass therethrough.

12. The high-frequency module according to claim 1, wherein
the filter is a transmission filter configured to allow a transmission signal as the high-frequency signal to pass therethrough.

13. The high-frequency module according to claim 1, further comprising:
a plurality of external connection terminals disposed at the second principal surface of the mounting substrate, wherein
the metal member is connected to an external connection terminal connected to the ground, among the plurality of external connection terminals.

14. The high-frequency module according to claim 3, wherein the shielding layer covers at least a portion of a side surface of the resin layer, and the shielding layer disposed at the side surface of the resin layer is electrically connected to at least one end portion of the plate-shaped first member.

15. The high-frequency module according to claim 4, wherein the shielding layer covers at least a portion of a side surface of the resin layer, and the shielding layer disposed at the side surface of the resin layer is electrically connected to at least one end portion of the plate-shaped first member.

16. The high-frequency module according to claim 5, wherein the shielding layer covers at least a portion of a side surface of the resin layer, and the shielding layer disposed at the side surface of the resin layer is electrically connected to at least one end portion of the plate-shaped first member.

17. The high-frequency module according to claim 3, wherein the shielding layer covers at least a portion of a side surface of the resin layer, the metal member further has a plate-shaped fourth member opposed to the second member, and the shielding layer disposed at the side surface of the resin layer is electrically connected to the fourth member.

18. A communication device comprising:

the high-frequency module according to claim 1; and a signal processing circuit configured to process the high-frequency signal passing through the high-frequency module.

19. A high-frequency module comprising:

a mounting substrate having a first principal surface and a second principal surface opposed to each other;

a filter disposed at the first principal surface of the mounting substrate and configured to allow a high-frequency signal to pass therethrough;

a power amplifier disposed at the first principal surface of the mounting substrate and configured to amplify the high-frequency signal;

a resin layer provided on a first principal surface side of the mounting substrate, and covering at least a portion of an outer peripheral surface of the power amplifier;

a shielding layer provided to a surface of the resin layer on an opposite side from the mounting substrate, covering at least a portion of the resin layer, and connected to a ground;

a metal member disposed at the first principal surface of the mounting substrate; and an electronic component disposed at the first principal surface of the mounting substrate, wherein the metal member has a plate-shaped first member provided between the power amplifier and the shielding layer, and a plate-shaped second member intersecting with the first member, the first member is connected to the power amplifier and the shielding layer, and the metal member has a portion disposed between the filter and the electronic component when seen in plan view in a thickness direction of the mounting substrate.

\* \* \* \* \*